(12) United States Patent
Keegan

(10) Patent No.: US 10,767,395 B2
(45) Date of Patent: Sep. 8, 2020

(54) EQUIPMENT RACK

(71) Applicant: Green Touch Industries, Inc., Lake Park, FL (US)

(72) Inventor: Daniel J. Keegan, Riviera Beach, FL (US)

(73) Assignee: Green Touch Industries, Inc., Lake Park, FL (US)

( * ) Notice: Subject to any disclaimer, the term of this patent is extended or adjusted under 35 U.S.C. 154(b) by 0 days.

(21) Appl. No.: 16/272,929

(22) Filed: Feb. 11, 2019

(65) Prior Publication Data

US 2019/0169880 A1    Jun. 6, 2019

Related U.S. Application Data

(63) Continuation of application No. 15/673,246, filed on Aug. 9, 2017, now Pat. No. 10,202,786.

(51) Int. Cl.
| | |
|---|---|
| *E05B 73/00* | (2006.01) |
| *F16M 11/00* | (2006.01) |
| *A01G 20/30* | (2018.01) |
| *F16M 13/04* | (2006.01) |
| *A47L 5/36* | (2006.01) |
| *A01G 18/60* | (2018.01) |
| *A47F 5/00* | (2006.01) |
| *A47F 7/00* | (2006.01) |
| *F16M 13/00* | (2006.01) |
| *A47B 81/02* | (2006.01) |

(52) U.S. Cl.
CPC .............. *E05B 73/00* (2013.01); *A01G 18/60* (2018.02); *A01G 20/30* (2018.02); *A47L 5/36* (2013.01); *F16M 11/00* (2013.01); *F16M 13/04* (2013.01); *A47B 81/02* (2013.01); *A47F 5/00* (2013.01); *A47F 7/00* (2013.01); *F16M 13/00* (2013.01)

(58) Field of Classification Search
CPC ......... E05B 73/00; F16M 11/00; A01G 20/30; A01G 20/43; A01G 20/47; A01G 1/12; A01G 1/125; A47L 9/0009; A47L 9/0063; A62B 25/00; A62B 9/04; F17C 13/084; A62C 13/78
USPC ....................................... 15/327.5
See application file for complete search history.

(56) References Cited

U.S. PATENT DOCUMENTS

| 504,683 A | 9/1893 | Peartree |
| 763,461 A | 6/1904 | Burton |
| 1,291,430 A | 1/1919 | Davenport |

(Continued)

FOREIGN PATENT DOCUMENTS

WO    WO 2010008374 A1    1/2010

OTHER PUBLICATIONS www.trimmertrap.com/racks/tt2.htm (posted at least as of Aug. 20, 2007); 3 pages.

(Continued)

*Primary Examiner* — Patrick D Hawn
(74) *Attorney, Agent, or Firm* — Sheppard Mullin Richter & Hampton LLP

(57) ABSTRACT

A lockable equipment rack for a backpack blower is presented. A lockable equipment rack includes adjustable components configured to storage of a variety of backpack blowers. The equipment rack can be installed in a variety of locations, for example a trailer, and securely store the backpack blower. The lockable equipment rack prevents theft of the backpack blower and tampering of its components.

20 Claims, 14 Drawing Sheets

(56) References Cited

U.S. PATENT DOCUMENTS

| | | | | |
|---|---|---|---|---|
| 2,016,132 | A | 10/1935 | Bergslien | |
| 2,404,513 | A * | 7/1946 | McCabe | F17C 13/085 206/446 |
| 2,595,752 | A * | 5/1952 | Batts | A47L 9/00 15/246.2 |
| 3,326,385 | A | 6/1967 | Pinkerton | |
| 3,490,727 | A * | 1/1970 | Miller | A62C 15/00 211/101 |
| 3,547,391 | A * | 12/1970 | Johnson | A62B 9/04 211/85.18 |
| 3,625,563 | A | 12/1971 | Dickinson | |
| 3,664,164 | A | 5/1972 | Zaidener | |
| 3,737,133 | A * | 6/1973 | Boecker | A62C 13/78 211/85.18 |
| 3,767,093 | A * | 10/1973 | Pinkerton | F41A 23/18 211/64 |
| 3,780,972 | A * | 12/1973 | Brodersen | A62C 13/78 211/85.18 |
| 3,854,428 | A | 12/1974 | Fullenkamp | |
| 4,168,007 | A * | 9/1979 | Rohatensky | B63C 11/02 211/85.18 |
| 4,450,989 | A | 5/1984 | Bogar | |
| 4,596,334 | A | 6/1986 | Daulton | |
| 4,696,405 | A | 9/1987 | Waring | |
| 4,776,471 | A | 10/1988 | Elkins | |
| 4,805,781 | A | 2/1989 | Tegel | |
| 4,863,019 | A * | 9/1989 | Lewis | A63B 55/00 206/315.3 |
| 4,946,186 | A * | 8/1990 | Cheng | B62B 1/045 280/646 |
| 4,967,942 | A | 11/1990 | McGruder | |
| 5,169,114 | A | 12/1992 | O'Neill | |
| 5,451,072 | A | 9/1995 | Weng | |
| 5,513,416 | A * | 5/1996 | Bassler | A47L 9/0009 15/323 |
| 5,524,772 | A | 6/1996 | Simmons | |
| 5,533,701 | A * | 7/1996 | Trank | A62B 25/00 248/286.1 |
| 5,647,489 | A | 7/1997 | Bellis | |
| 5,853,223 | A | 12/1998 | Ritt | |
| 5,873,275 | A | 2/1999 | Lukich | |
| 5,879,014 | A | 3/1999 | Price | |
| 5,964,358 | A | 10/1999 | Hafendorfer | |
| 6,073,781 | A | 6/2000 | Puglisi | |
| 6,138,483 | A | 10/2000 | Galant | |
| 6,173,842 | B1 | 1/2001 | Fitzgerald | |
| 6,182,840 | B1 | 2/2001 | Tegel | |
| 6,185,917 | B1 * | 2/2001 | Goudes | B62B 3/02 56/12.8 |
| 6,302,280 | B1 * | 10/2001 | Bermes | B60R 9/00 211/175 |
| 6,311,853 | B1 | 11/2001 | Johnson | |
| 6,371,309 | B1 | 4/2002 | Smith | |
| 6,409,029 | B1 | 6/2002 | Bermes | |
| 6,484,544 | B1 | 11/2002 | Wing | |
| 6,494,549 | B2 * | 12/2002 | Van Daalwyk | F17C 13/084 211/81 |
| 6,536,610 | B1 | 3/2003 | Taylor | |
| 6,619,485 | B1 | 9/2003 | Jenkins | |
| 6,648,152 | B2 * | 11/2003 | Bermes | B25H 3/006 211/175 |
| 6,702,242 | B1 * | 3/2004 | Ziaylek, Jr. | B60N 2/24 248/154 |
| 6,889,947 | B2 * | 5/2005 | Alberts | A62C 13/78 248/230.1 |
| 6,966,540 | B2 | 11/2005 | Falk | |
| 7,044,347 | B1 | 5/2006 | Pedrini | |
| 7,300,484 | B2 * | 11/2007 | Scully | A47L 5/14 55/385.1 |
| 7,367,749 | B2 * | 5/2008 | Kim | A45F 3/047 405/186 |
| 7,437,796 | B2 * | 10/2008 | Rappin | A01B 1/065 15/326 |
| 7,448,586 | B2 * | 11/2008 | Ziaylek | A62B 25/00 248/311.3 |
| 7,509,706 | B2 * | 3/2009 | Clarke | A47L 5/225 15/327.5 |
| 7,594,415 | B1 | 9/2009 | Wu | |
| 7,703,778 | B2 | 4/2010 | Refsum | |
| 7,849,557 | B1 * | 12/2010 | Bellis, Jr. | B60P 3/14 15/327.2 |
| 7,878,472 | B2 * | 2/2011 | Lackore | B60R 11/00 211/75 |
| 7,934,688 | B2 * | 5/2011 | Wilk | F17C 13/084 211/71.01 |
| 7,963,597 | B2 * | 6/2011 | Bostrom | A62B 9/04 248/313 |
| 7,997,595 | B1 | 8/2011 | Pope | |
| 8,021,278 | B2 | 9/2011 | Huyck | |
| 8,052,209 | B2 * | 11/2011 | Bostrom | A62B 9/04 224/275 |
| 8,141,836 | B2 | 3/2012 | Saez | |
| 8,220,764 | B2 * | 7/2012 | Ziaylek | A62B 25/00 224/275 |
| 8,245,859 | B2 | 8/2012 | Sargent | |
| 8,272,999 | B2 | 9/2012 | Huyck | |
| 8,365,969 | B2 * | 2/2013 | Johnson | B60R 9/08 190/14 |
| 8,480,170 | B2 | 7/2013 | Lu | |
| 8,640,888 | B2 | 2/2014 | Liu | |
| 9,764,171 | B2 * | 9/2017 | Ziaylek | A62B 25/00 |
| 9,803,399 | B2 * | 10/2017 | Benning | E05B 73/00 |
| 2001/0005918 | A1 * | 7/2001 | Miyamoto | A47L 5/14 15/326 |
| 2002/0060107 | A1 * | 5/2002 | Kamoshita | F04D 29/664 181/214 |
| 2002/0174511 | A1 * | 11/2002 | Iida | A47L 5/14 15/405 |
| 2003/0106977 | A1 * | 6/2003 | Alberts | A62C 13/78 248/313 |
| 2003/0122048 | A1 * | 7/2003 | Field | A62B 25/00 248/313 |
| 2005/0132531 | A1 | 6/2005 | Haberlein | |
| 2005/0205750 | A1 * | 9/2005 | Hafendorfer | F16M 13/02 248/637 |
| 2006/0219849 | A1 | 10/2006 | Chiu | |
| 2007/0090069 | A1 | 4/2007 | Hafendorfer | |
| 2007/0090137 | A1 * | 4/2007 | Kim | A45F 3/047 224/153 |
| 2007/0215781 | A1 | 9/2007 | Watt | |
| 2007/0235600 | A1 | 10/2007 | Herold | |
| 2008/0078727 | A1 | 4/2008 | Sargent | |
| 2008/0172826 | A1 * | 7/2008 | Rappin | A01B 1/065 15/405 |
| 2010/0051567 | A1 * | 3/2010 | Ross, Jr. | B60K 15/07 211/85.18 |
| 2010/0170924 | A1 * | 7/2010 | Johnson | B60R 9/08 224/413 |
| 2010/0276380 | A1 | 11/2010 | Sargent | |
| 2011/0147547 | A1 | 6/2011 | Fitzpatrick | |
| 2011/0240572 | A1 | 10/2011 | Kerman | |
| 2012/0043290 | A1 | 2/2012 | Keyvanloo | |
| 2013/0220949 | A1 * | 8/2013 | Sargent | A01G 20/43 211/4 |
| 2015/0282435 | A1 * | 10/2015 | Mutoh | A01G 1/125 15/405 |
| 2015/0308159 | A1 * | 10/2015 | Benning | E05B 73/00 292/315 |
| 2016/0194906 | A1 * | 7/2016 | Hentschel | E05B 73/00 70/58 |
| 2016/0198636 | A1 * | 7/2016 | Poole | A01G 1/125 15/327.5 |
| 2017/0238471 | A1 * | 8/2017 | Ishikawa | A01G 1/125 |

OTHER PUBLICATIONS www.rackemmfg.com/open.shtml (posted at least as of Aug. 20, 2007); 2 pages.

(56) References Cited

OTHER PUBLICATIONS www.junglejimsap.com/trailerracks.html (posted at least as of Aug. 20, 2007); 3 pages.

* cited by examiner

EQUIPMENT RACK

CROSS-REFERENCE TO RELATED APPLICATIONS

The present application is a continuation of and claims priority to U.S. patent application Ser. No. 15/673,246, filed Aug. 9, 2017, the entirety of which is incorporated herein by reference.

FIELD

This disclosure relates to equipment racks. More specifically, the present invention relates to a lockable equipment rack with adjustable components for storage of a variety of backpack blowers.

BACKGROUND

The need to securely store equipment such as a landscaping equipment on a moveable trailer or storage unit and/or allow for easy access has spawn a number of unique systems to storage an equipment.

SUMMARY

One aspect of the disclosure relates to an equipment rack configure to fasten, enclose, and/or secure a piece of equipment. The equipment rack may include one or more of a base container, a rear support wall, one or more rotatable locking arms, one or more locking mechanisms, one or more equipment clips, and/or other components.

In some implementations, the base container may include one or more of a base plate, a set of sidewalls, and/or other components. The set of sidewalls may include one or more individual sidewalls. The base container may form a partial enclosure. The base container may include a bottom wall (e.g. the base plate) and/or a set of sidewalls. The partial enclosure formed by the base container may be configured to partially enclose at least part of the equipment.

In some implementations, the rear support wall may include one or more of a rear plate, a set of sidewalls, one or more rotating hinges, one or more locking mechanisms, one or more equipment clips, and/or other components. The rear support wall may form a partial enclosure. The partial enclosure formed by the rear support wall may be configured to partially enclose at least part of the equipment.

In some implementations, an individual rotatable locking arm may be configured to restrain and/or enclose a portion of the equipment. The rotatable locking arm may restrain a portion of the equipment in a restrained position within a space between the rotatable locking arm and the rear support wall. In the restrained position, removal of the equipment from the rotatable locking arm, the rear support wall, the base container, and/or other components of the equipment rack may be restricted.

In some implementation, the one or more locking mechanisms may be configured restrain and/or restrict the movement of a rotatable locking arm in a locked position. The rotatable locking arm and/or other components may obtained the locked position when the one or more locking mechanisms are engaged.

In some implementations, an individual equipment clip may be configured to hold one or more parts and/or pieces of the equipment. The equipment clip may be configured to be substantially U-shaped and/or other shapes to hold one or more parts and/or pieces of the equipment. For example, the equipment clip may be configured to hold a hose and/or nozzle portion of the equipment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
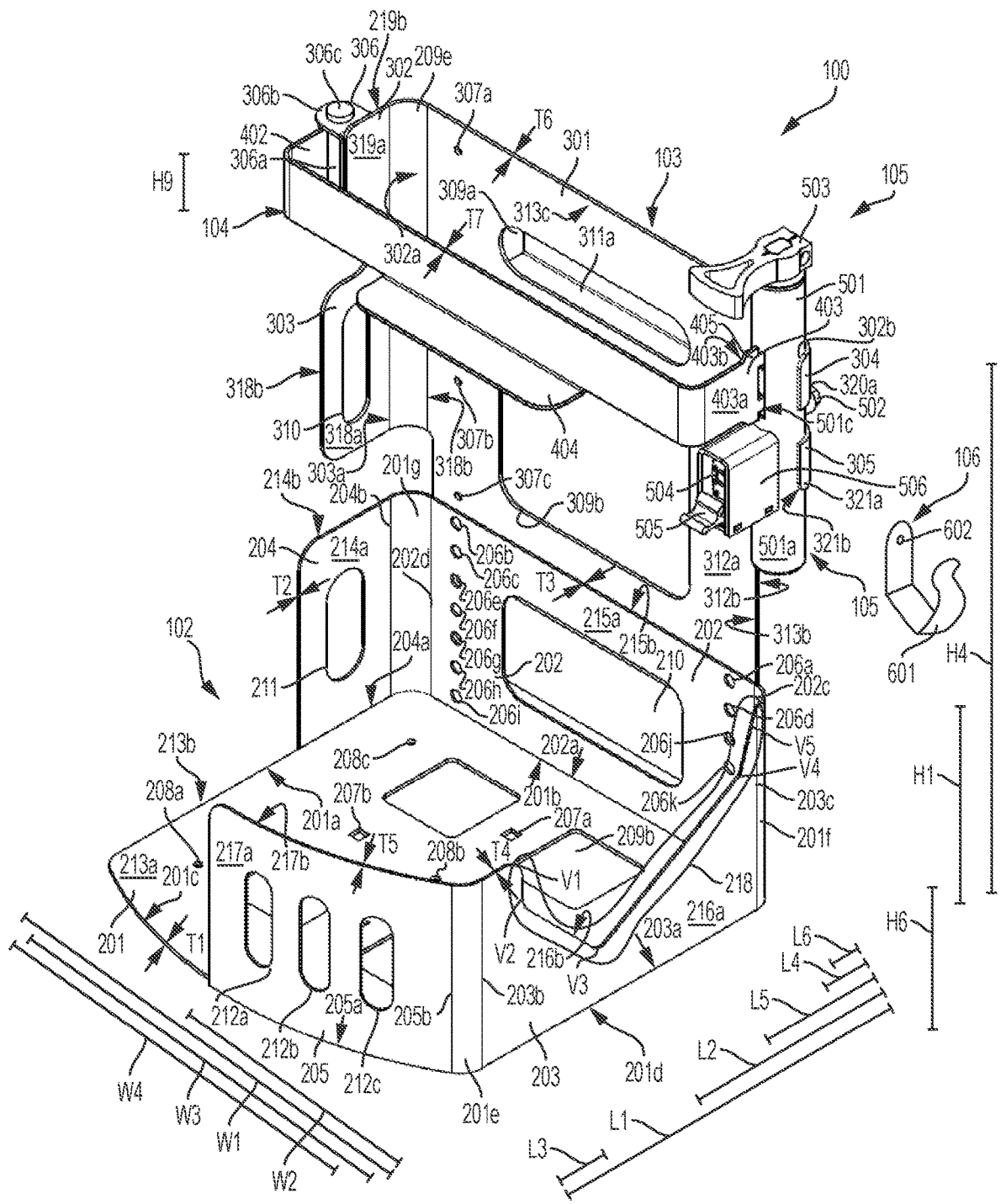
FIG. 1 is a three-dimensional diagram illustrating a first isometric view of an equipment rack with the rotatable locking arm in the locked position and an equipment hook.

FIGS. 1 to 8 illustrates equipment rack 100 including one or more of a base container 102, a rear support wall 103, one or more rotatable locking arms (such as a rotatable locking arm 104), one or more locking mechanisms (such as locking mechanisms 105), one or more equipment clips (such as equipment clips 106), and/or other components.

Figure 7:
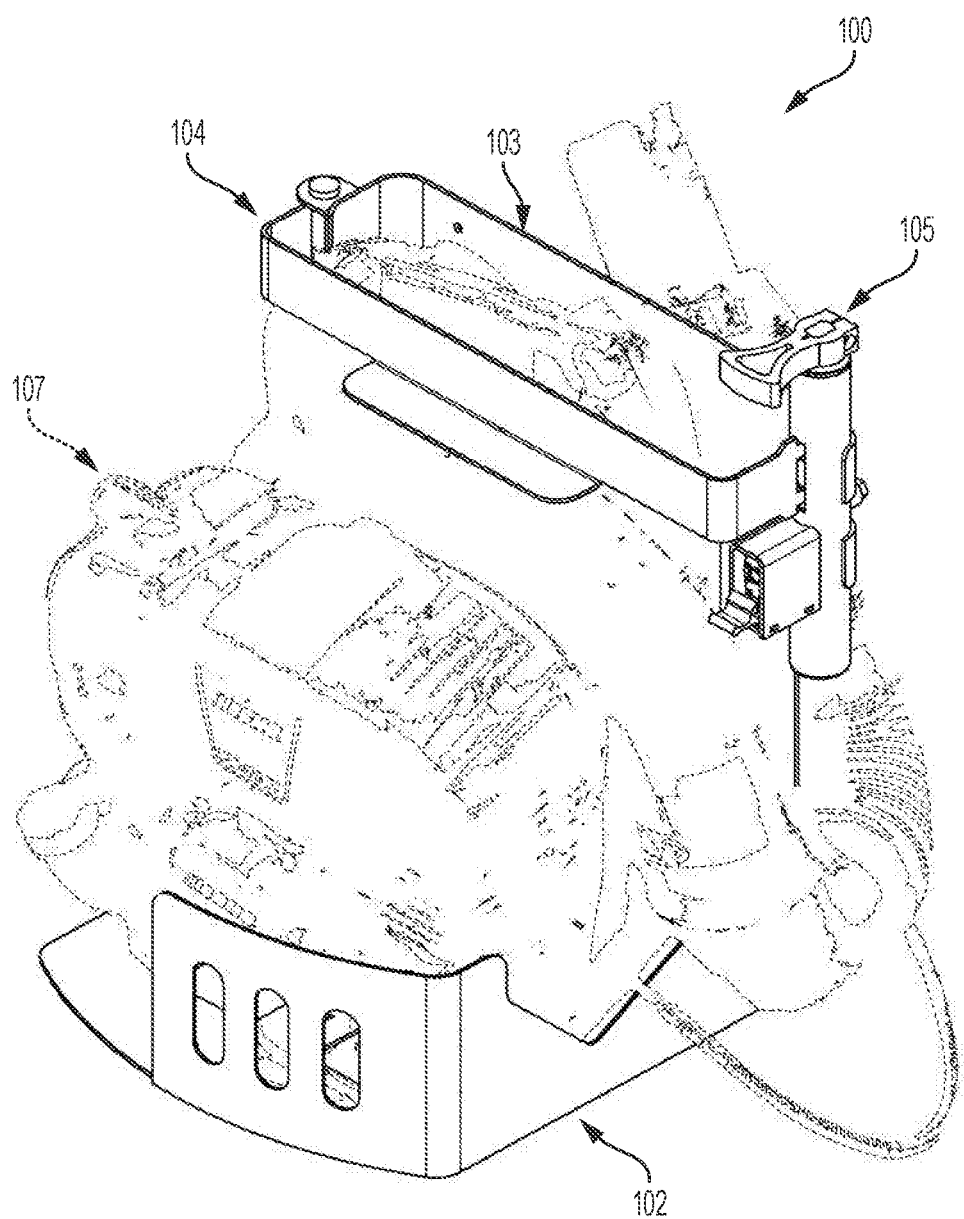
FIG. 7 is a three-dimensional diagram illustrating a blower fastened and secured within the equipment rack of FIG. 1.

Referring to FIG. 7, an equipment 107 may be fastened, enclosed, restrained, and/or secured within the equipment rack 100. The equipment 107 may sit in the base container 102. The equipment 107 may rest on the rear support wall 103. The rotatable locking arm 104 may restrain the equipment 107 within the equipment rack 100 when in a locked position. A portion of equipment 107 may be positioned within a space between the rear support wall 103 and/or the rotatable locking arm 104. The equipment 107 may be one or more of a backpack, a landscaping equipment, a blower, a container, and/or other equipment.

Referring back to FIG. 1, in some implementations, the base container 102 may include one or more of a base plate 201 (e.g. bottom wall), a first set of sidewalls, and/or other components. The first set of sidewalls may include one or more individual sidewalls. The first of sidewalls may include one or more of a first sidewall 205, a second sidewall 202, a third sidewall 203, a forth sidewall 204, and/or other sidewalls. The base container 102 may form a partial enclosure. The partial enclosure formed by the base container 102 may be configured to partially enclose the equipment 107 (not shown in FIG. 1). The first set of sidewalls may traverse base plate 201 along the base plates 201's perimeter. The base plate 201 and/or set of sidewalls may be joined together to form the partial enclosure. The partial enclosure may be formed such that rotation of the equipment 107 relative the base container 102 and/or other components may be restricted with respect to one or more axes of rotation. In a non-limiting example, the base container 102 may prevent the equipment 107 from rotating in a longitudinal axis, a latitudinal axis, and/or other axis when the equipment 107 is within the base container 102. The base container 102 may prevent the equipment 107 from rotating in any axis of rotation.

In some implementations, the base plate 201 may be configured to prevent access to one or more sides of the equipment 107. The base plate 201 may enclose one or more sides of the equipment 107. The base plate 201 may be made of one or more materials. In a non-limiting example, the one or more materials may include one or more of metal, wood, plastic, carbon fiber, and/or other materials.

In some implementations, the base plate 201 may comprise a solid body having one or more surfaces and/or one or more edges. The solid body may form a shape, such as a rectangular shape, a triangular shape, a circular shape, and/or other shapes. The one or more surfaces may include one or more of a first surface 213a, a second surface 213b opposite the first surface 213a, and/or other surfaces of the base plate 201.

In some implementations, the solid body of the base plate 201 may include a first set of openings. The first set of openings may include one or more of opening 207a, opening 207b, opening 207c, opening 207d, opening 208a, opening 208b, opening 208c, opening 208d, opening 209a, opening 209b, opening 209c, and/or opening 209d. The individual openings in the first set of openings may communicate through the solid body of the base plate 201 from the first surface 213a to the second surface 213b. The individual openings in the first set of openings may be located within the boundaries and/or perimeter of the base plate 201. The individual openings in the first set of openings may be one or more of one or more cutaways, one or more apertures, and/or other openings. The individual openings in the first set of openings may have individual shapes. One or more of opening 207a, opening 207b, opening 207c, opening 207d, opening 208a, opening 208b, opening 208c, opening 208d, and/or other openings may be used to couple the base plate 201 to one or more support surfaces and/or objects and/or provide other purposes. One or more of opening 209a, opening 209b, opening 209c, opening 209d and/or other openings may be used to facilitate air ventilation and/or provide other purposes.

In some implementations, the individual openings in the first set of openings may be configured to receive one or more of one or more fasteners, and/or other coupling devices. In some implementations, the individual openings in the first set of openings may be configured to facilitate one or more of a coupling between base plate 201 and/or one or more surfaces, components, equipment, and/or other objects. In some implementations, the individual openings in the first set of openings may be configured to reduce the weight of the base plate 201 and/or provide other purposes.

In some implementations, some of the individual openings in the first set of openings may be aligned on the base plate 201 in one or more patterns. In a non-limiting example, some of the individual openings in the first set of openings may be aligned in one or more of a circular pattern, angular pattern, rectangular pattern, and/or other patterns. Some of the individual openings in the first set of openings may be aligned along the edges and/or close to the edges the surfaces of the base plate 201.

In some implementations, the base plate 201 may be configured to couple to one or more support surfaces and/or other objects for mounting and/or securing the base plate 201 and/or the equipment rack 100. In a non-limiting example, the base plate 201 may be configured to couple to one or more of a floor, a truck bed, a rail, a pole and/or other surfaces, objects, and/or components.

In some implementations, the base plate 201 may be sized to support and/or enclose the equipment 107. In a non-limiting example, the base plate 201 may be defined by one or more of a first length L1, a first width W1, a first thickness T1, and/or other measurements. In some implementations, the first length L1 may be in the range 0 to 1 meters. In some implementations, the first length L1 may be in the range 0 to 0.75 meters. In some implementations, the first length L1 may be in the range 0 to 0.5 meters. In some implementations, the first length L1 may be in the range 0 to 0.25 meters. In some implementations, the first length L1 may be in the range 0.25 to 0.4 meters. In some implementations, the first length L1 may be in the range 0.4 to 0.5 meters. In some implementations, the first width W1 may be in the range 0 to 1 meters. In some implementations, the first width W1 may be in the range 0 to 0.75 meters. In some implementations, the first width W1 may be in the range 0 to 0.5 meters. In some implementations, the first width W1 may be in the range 0 to 0.25 meters. In some implementations, the first width W1 may be in the range 0.25 to 0.4 meters. In some implementations, the first width W1 may be in the range 0.4 to 0.5 meters. In some implementations, the first thickness T1 may be in the range 0 to 0.1 meters. In some implementations, the first thickness T1 may be in the range 0 to 0.075 meters. In some implementations, the first thickness T1 may be in the range 0 to 0.05 meters. In some implementations, the first thickness T1 may be in the range 0 to 0.01 meters. In some implementations, the first thickness T1 may be in the range 0 to 0.005 meters. In some implementations, the first thickness T1 may be in the range 0 to 0.001 meters. In some implementations, the first thickness T1 may be in the range 0.001 to 0.005 meters. In some implementations, the first thickness T1 may be in the range 0.005 to 0.01 meters.

Figure 9:
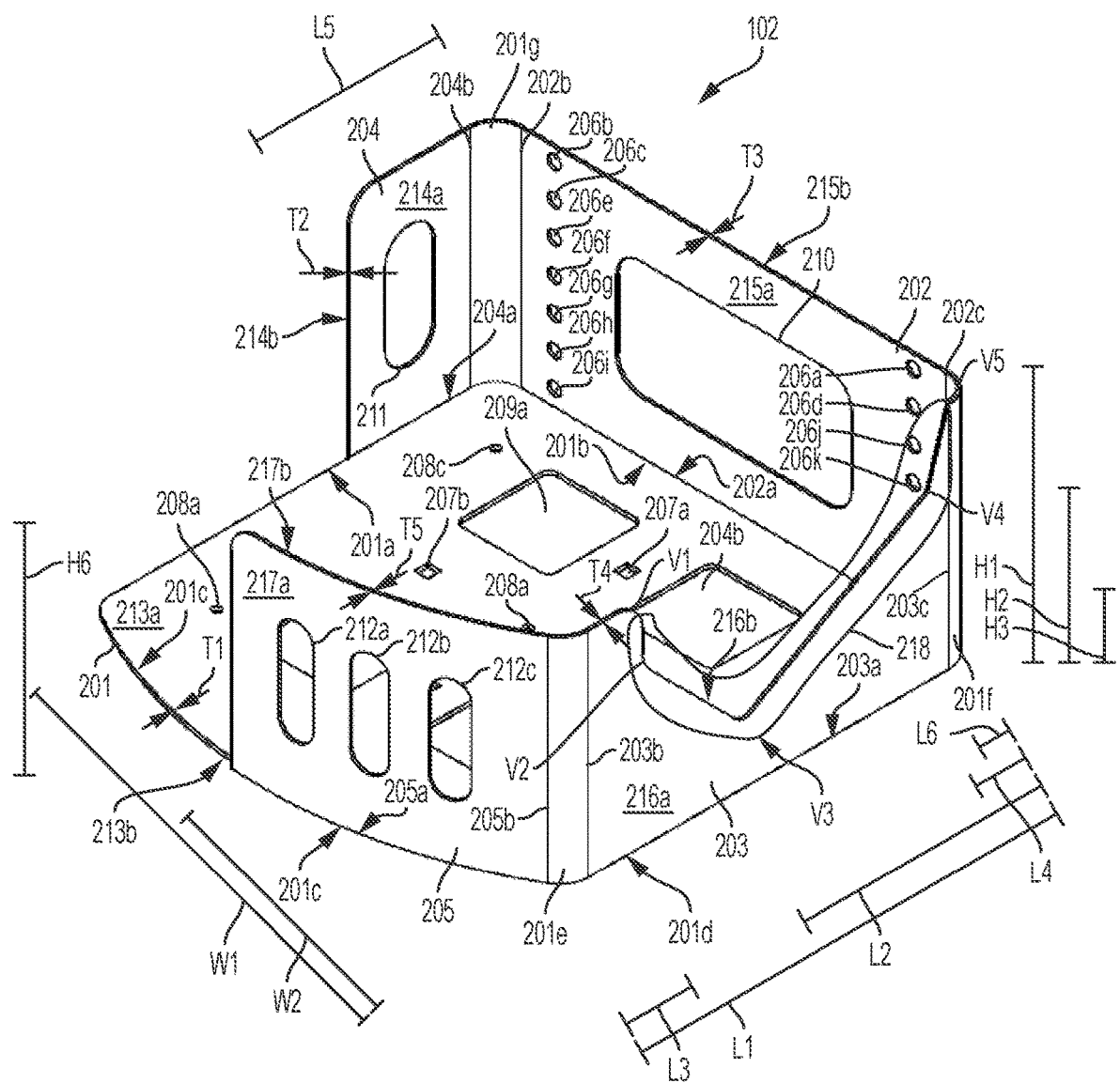
FIG. 9 is a three-dimensional diagram illustrating a base container of the equipment rack of FIG. 1.

Referring still to base container 102 in FIG. 9, in some implementations, the set of sidewalls of the base container 102 may include one or more of the first sidewall 205, the second sidewall 202, the third sidewall 203, the forth sidewall 204, and/or other sidewalls. In some implementation, the first sidewall 205, the second sidewall 202, the third sidewall 203, and/or the forth sidewall 204 may be configured to prevent access to one or more sides of the equipment 107 (not shown in FIG. 9). The first sidewall 205, the second sidewall 202, the third sidewall 203, and/or the forth sidewall 204 may enclose one or more sides of the equipment 107. The first sidewall 205, the second sidewall 202, the third sidewall 203, and/or the forth sidewall 204 may be made of one or more materials. In a non-limiting example, the one or more materials may include one or more of metal, plastic, wood, carbon fiber, and/or materials.

In some implementations, the individual sidewalls in the first of sidewalls (such as the first sidewall 205, the second sidewall 202, the third sidewall 203, the forth sidewall 204 and/or other sidewalls) may comprise individual solid bodies having one or more surfaces and/or one or more edges. The one or more surfaces may include a third surface 214a, a fourth surface 214b opposite the third surface 214a, a fifth surface 215a, a sixth surface 215b opposite the surface 215a, a seventh surface 216a, an eighth surface 216b opposite the seventh surface 216a, a ninth surface 217a, and/or a tenth surface 217b opposite the ninth surface 217a. The solid body may form a shape, such as a rectangular shape, a triangular shape, a circular shape, and/or other shapes. The first sidewall 205 may include the ninth surface 217a and the tenth surface 217b opposite the ninth surface 217a. The second sidewall 202 may include the fifth surface 215a and the sixth surface 215b opposite the fifth surface 215a. The third sidewall 203 may include the seventh surface 216a and the eighth surface 216b opposite the seventh surface 216a. The fourth sidewall 204 may include the third surface 214a and the fourth surface 214b opposite the third surface 214a.

In some implementations, the individual solid bodies of the first sidewall 205, the second sidewall 202, the third sidewall 203, and/or the forth sidewall 204 may include a second set of openings. The second set of openings may include one or more of opening 206a, opening 206b, opening 206c, opening 206d, opening 206e, opening 206f, opening 206g, opening 206h, opening 206i, opening 206j, opening 206k, opening 206L, opening 206m, opening 206n, opening 210, opening 211, opening 212a, opening 212b, and/or opening 212c. In some implementations, individual openings in the second set of openings may be located within the boundaries and/or perimeter of the first sidewall 205, the second sidewall 202, the third sidewall 203, and/or the forth sidewall 204, respectively. The individual openings in the second set of openings may include one or more of one or more cutaways, one or more apertures, and/or other openings. The first sidewall 205 may include one or more of the opening 212a, opening 212b, and/or opening 212c. The second side wall 202 may include one or more of the opening 206a, opening 206b, opening 206c, opening 206d, opening 206e, opening 206f, opening 206g, opening 206h, opening 206i, opening 206j, opening 206k, opening 206L, opening 206m, opening 206n and/or opening 210. The opening 206a, opening 206b, opening 206c, opening 206d, opening 206e, opening 206f, opening 206g, opening 206h, opening 206i, opening 206j, opening 206k, opening 206L, opening 206m, and/or opening 206n may be similar openings. One or more of the opening 206b, opening 206c, opening 206e, opening 206f, opening 206g, opening 206h, and/or opening 206i may be aligned close to an edge (such as a fifth side edge 202b) of the second sidewall 202. One or more of the opening 206a, opening 206c, opening 206j, opening 206k, opening 206L, and/or opening 206m may be aligned close to a separate edge (such as a fourth side edge 202c) of the second sidewall 202. The third sidewall 203 may include a substantial V-shaped cutaway 218, described in more detail herein. The fourth sidewall 204 may include the opening 211. The circular outline used to highlight the substantial V-shaped cutaway 218 does not form a part of the structure of the base container 102, but is used only to highlight the V-shaped cutaway of the third sidewall 203.

Individual openings may have individual shapes. In some implementations, one or more of the opening 206a, opening 206b, opening 206c, opening 206d, opening 206e, opening 206f, opening 206g, opening 206h, opening 206i, opening 206j, opening 206k, opening 206L, opening 206m, opening 206n and/or other openings may be configured to receive one or more of one or more fasteners and/or other coupling devices. In some implementations, one or more of the opening 206a, opening 206b, opening 206c, opening 206d, opening 206e, opening 206f, opening 206g, opening 206h, opening 206i, opening 206j, opening 206k, opening 206L, opening 206m, opening 206n and/or other openings may be configured to facilitate one or more of a coupling between the second sidewall 202, and one or more surfaces, equipment, and/or other objects. In some implementations, one or more of the opening 210, opening 211, opening 212a, opening 212b, opening 212c, and/or other openings may be configured to facilitate air for ventilation and/or provide other purposes. In some implementations, one or more of the opening 210, opening 211, opening 212a, opening 212b, opening 212c, and/or other openings may be configured to reduce the weight of the individual sidewalls and/or other provide other purposes.

The second sidewall 202 may be configured to couple with one or more components of the equipment rack 100. Coupling may be accomplished by one or more of one or more fasteners, one or more adhesives, and/or other coupling devices and/or chemicals. The one or more fasteners may include a first screw 701, a second screw 702, a third screw 703, and/or other fasteners.

In a non-limiting example, at least one sidewall may be configured to couple with the rear support wall 103 and/or other components. Further explanation of the coupling of at least one sidewall to the rear support wall 103 is provided in more detail herein. In some implementations, the second sidewall 202 may be configured to couple with the rear support wall 103. The second sidewall 202 may be coupled with the rear plate 301 by using the one or more openings included in the second sidewall 202 and/or one or more openings included in the rear plate 301 (such as opening 308a, opening 308b, opening 308c, and/or opening 308d). The second sidewall 202 may be coupled with the rear plate 301 by one or more of one or more fasteners, one or more adhesives, and/or other coupling devices and/or chemicals. The one or more fasteners may be one or more of one or more screws (such as the first screw 701, the second screw 702, the third screw 703, and/or other screws), one or more rivets, and/or other fasteners.

In some implementations, one or more of the opening 212a, opening 212b, opening 212c, and/or other openings may be aligned on the first sidewall 205 in one or more patterns. One or more of the opening 206a, opening 206b, opening 206c, opening 206d, opening 206f, opening 206g, opening 206h, opening 206i, opening 206j, opening 206k, opening 206L, opening 206m, opening 206n, opening 210, and/or other openings may be aligned on the second sidewall 202 in one or more patterns. One or more of the opening 211, and/or other openings may be aligned on the fourth sidewall 204 in one or more patterns.

In some implementations, first sidewall 205 may be sized to support and/or enclose the equipment 107. In a non-limiting example, the first sidewall 205 may be defined by one or more of a second width W2, a sixth height H6, fifth thickness T5, and/or other measurements. In some implementations, the second width W2 may range between 0 to 1 meters. In some implementations, the second width W2 may range between 0 to 0.75 meters. In some implementations, the second width W2 may range between 0 to 0.5 meters. In some implementations, the second width W2 may range between 0 to 0.25 meters. In some implementations, the second width W2 may range between 0 to 0.2 meters. In some implementations, the second width W2 may range between 0 to 0.1 meters. In some implementations, the second width W2 may range between 0.1 to 0.2 meters. In some implementations, the sixth height H6 may range between 0 to 1 meters. In some implementations, the sixth height H6 may range between 0 to 0.75 meters. In some implementations, the sixth height H6 may range between 0 to 0.5 meters. In some implementations, the sixth height H6 may range between 0 to 0.25 meters. In some implementations, the sixth height H6 may range between 0 to 0.1 meters. In some implementations, the sixth height H6 may range between 0.1 to 0.2 meters. In some implementations, the fifth thickness T5 may range between 0 to 0.1 meters. In some implementations, the fifth thickness T5 may be in the range 0 to 0.075 meters. In some implementations, the fifth thickness T5 may be in the range 0 to 0.05 meters. In some implementations, the fifth thickness T5 may be in the range 0 to 0.01 meters. In some implementations, the fifth thickness T5 may be in the range 0 to 0.005 meters. In some implementations, the fifth thickness T5 may be in the range 0 to 0.001 meters. In some implementations, the fifth thickness T5 may be in the range 0.001 to 0.005 meters. In some implementations, the fifth thickness T5 may be in the range 0.005 to 0.01 meters.

In some implementations, second sidewall 202 may be sized to support and/or enclose the equipment 107. In a non-limiting example, the second sidewall 202 may be defined by one or more of the first width W1, a first height H1, a third thickness T3, and/or other measurements. In some implementations, the third thickness T3 may range between 0 to 0.1 meters. In some implementations, the third thickness T3 may be in the range 0 to 0.075 meters. In some implementations, the third thickness T3 may be in the range 0 to 0.05 meters. In some implementations, the third thickness T3 may be in the range 0 to 0.01 meters. In some implementations, the third thickness T3 may be in the range 0 to 0.005 meters. In some implementations, the third thickness T3 may be in the range 0 to 0.001 meters. In some implementations, the third thickness T3 may be in the range 0.001 to 0.005 meters. In some implementations, the third thickness T3 may be in the range 0.005 to 0.01 meters.

In some implementations, third sidewall 203 may be sized to support and/or enclose the equipment 107. In a non-limiting example, the third sidewall 203 may be defined by one or more of the first length L1, a first height H1, the sixth height H6, a fourth thickness T4, the substantial V-shaped cutaway 218, and/or other measurements. In some implementations, the first height H1 may range between 0 to 0.5 meters. In some implementations, the first height H1 may range between 0 to 0.4 meters. In some implementations, the first height H1 may range between 0 to 0.3 meters. In some implementations, the first height H1 may range between 0 to 0.2 meters. In some implementations, the first height H1 may range between 0 to 0.1 meters. In some implementations, the first height H1 may range between 0.1 to 0.2 meters. In some implementations. the fourth thickness T4 may range between 0 to 0.1 meters. In some implementations, the fourth thickness T4 may be in the range 0 to 0.075 meters. In some implementations, the fourth thickness T4 may be in the range 0 to 0.05 meters. In some implementations, the fourth thickness T4 may be in the range 0 to 0.01 meters. In some implementations, the fourth thickness T4 may be in the range 0 to 0.005 meters. In some implementations, the fourth thickness T4 may be in the range 0 to 0.001 meters. In some implementations, the fourth thickness T4 may be in the range 0.001 to 0.005 meters. In some implementations, the fourth thickness T4 may be in the range 0.005 to 0.01 meters.

Figure 2:
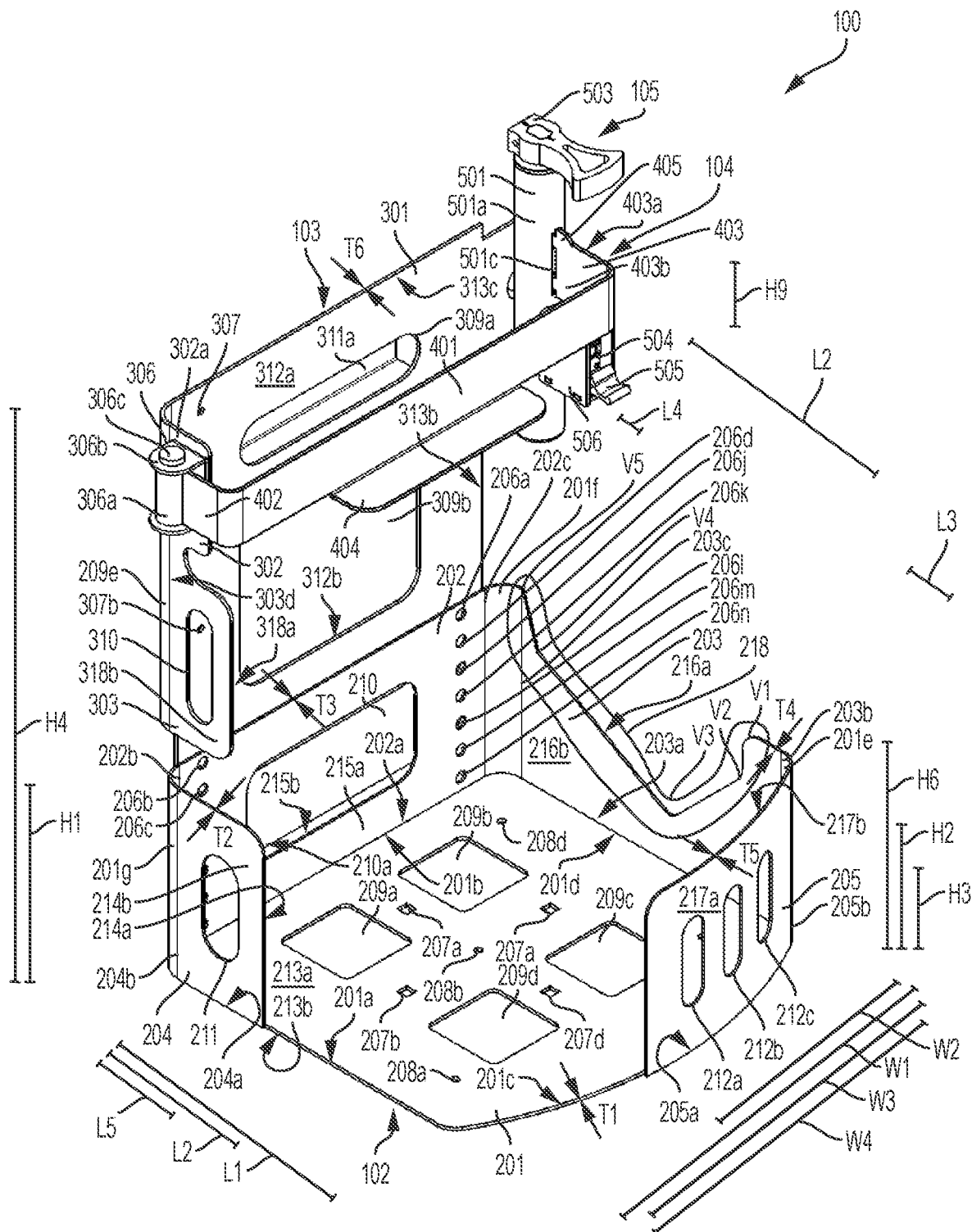
FIG. 2 is a three-dimensional diagram illustrating a second isometric view of the equipment rack of FIG. 1 with the rotatable locking arm in the locked position.
Figure 3:
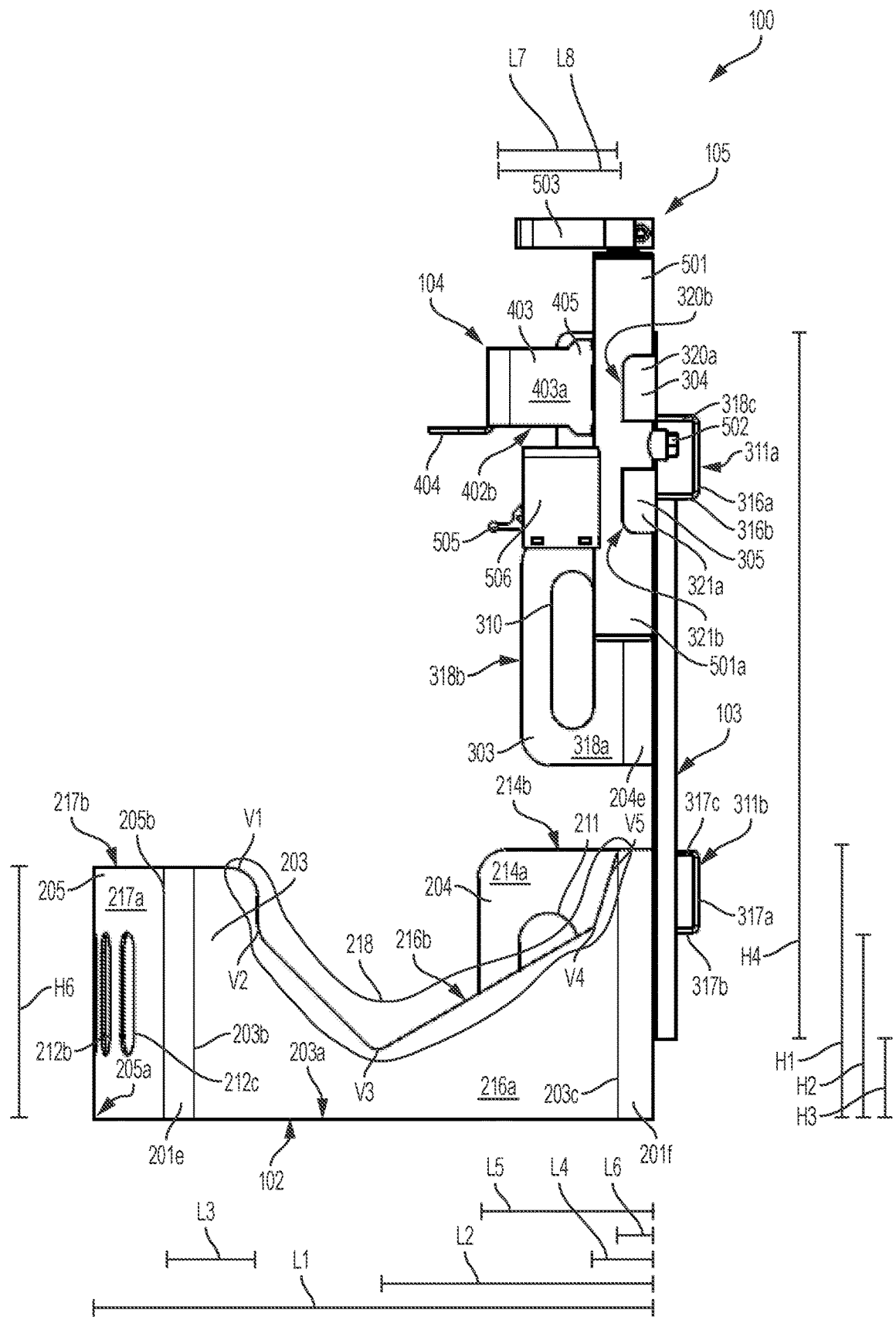
FIG. 3 is an illustration of a first side view of the equipment rack of FIG. 1.

Referring to FIG. 2, the substantial V-shaped cutaway 218 may be defined by a first endpoint V1, a second end point V2, a third end point V3, a fourth endpoint V4, and/or a fifth endpoint V5. The first endpoint V1 may taper down to the second endpoint V2. The second endpoint V2 may taper down to the third endpoint V3. The fifth endpoint V5 may taper down to the forth endpoint V4. The forth endpoint V4 may taper down to the third endpoint V3. The endpoint V1 may have the height of the sixth height H6. The endpoint V5 may have the height of the first height H1.

The first endpoint V1 may be defined by the sixth height H6, and/or a third length L3 along the third sidewall 203. In some implementations, the third length L3 may range between 0 to 0.1. In some implementations, the third length L3 may range between 0 to 0.075. In some implementations, the third length L3 may range between 0 to 0.05. In some implementations, the third length L3 may range between 0.05 to 0.075. In some implementations, the third length L3 may range between 0.05 to 0.1. In some implementations, the third length L3 may range between 0 to 0.06. The second endpoint V2 may be defined a second height H2 and/or the third length L3 along the third sidewall 203. In some implementations. the second height H2 may range between 0 to 0.5 meters. In some implementations. the second height H2 may range between 0 to 0.25 meters. In some implementations. the second height H2 may range between 0 to 0.15 meters. In some implementations. the second height H2 may range between 0 to 0.1 meters. In some implementations. the second height H2 may range between 0.1 to 0.2 meters. In some implementations. the second height H2 may range between 0 to 0.114 meters. The third endpoint V3 may be defined by a third height H3 and/or a second length L2 along the third sidewall 203. In some implementations, the third height H3 may range between 0 to 0.5 meters. In some implementations, the third height H3 may range between 0 to 0.4 meters. In some implementations, the third height H3 may range between 0 to 0.3 meters. In some implementations, the third height H3 may range between 0 to 0.2 meters. In some implementations, the third height H3 may range between 0 to 0.1 meters. In some implementations, the third height H3 may range between 0 to 0.05 meters. In some implementations, the third height H3 may range between 0 to 0.005 meters. In some implementations, the third height H3 may range between 0.01 to 0.1 meters. In some implementations, the second length L2 may range between 0 to 0.5 meters. In some implementations, the second length L2 may range between 0 to 0.4 meters. In some implementations, the second length L2 may range between 0 to 0.3 meters. In some implementations, the second length L2 may range between 0 to 0.2 meters. In some implementations, the second length L2 may range between 0 to 0.1 meters. In some implementations, the second length L2 may range between 0.1 to 0.2 meters. In some implementations, the second length L2 may range between 0.1 to 0.3 meters. The fourth endpoint V4 may be defined by a fourth length L4 and/or a second height H2 along the third sidewall 203. In some implementations, the fourth length L4 may range between 0 to 0.1 meters. In some implementations, the fourth length L4 may range between 0 to 0.075 meters. In some implementations, the fourth length L4 may range between 0 to 0.05 meters. In some implementations, the fourth length L4 may range between 0 to 0.025 meters. In some implementations, the fourth length L4 may range between 0.025 to 0.075 meters. The fifth endpoint V5 may be defined by the first height H1 and/or a sixth length L6 along the third sidewall 203. In some implementations, the sixth length L6 may range between 0 to 0.1 meters. In some implementations, the sixth length L6 may range between 0 to 0.075 meters. In some implementations, the sixth length L6 may range between 0 to 0.05 meters. In some implementations, the sixth length L6 may range between 0 to 0.025 meters. In some implementations, the sixth length L6 may range between 0.25 to 0.05 meters. In some implementations, the sixth length L6 may range between 0.03 to 0.05 meters.

In some implementations, the substantial V-shaped cutaway 218 may allow the equipment 107 to protrude out and/or be situated above of the substantial V-shaped cutaway 218 of the third sidewall 203.

In some implementations, fourth sidewall 204 may be sized to support and/or enclose the equipment 107. In a non-limiting example, the fourth sidewall 204 may be defined by one or more of a fifth length L5, the first height H1, a second thickness T2, and/or other measurements. In some implementations, the fifth length L5 may range between 0 to 0.5 meters. In some implementations, the fifth length L5 may range between 0 to 0.25 meters. In some implementations, the fifth length L5 may range between 0 to 0.15 meters. In some implementations, the fifth length L5 may range between 0 to 0.01 meters. In some implementations, the fifth length L5 may range between 0.01 to 0.15 meters. In some implementations, the fifth length L5 may range between 0.01 to 0.25 meters. In some implementations, the second thickness T2 may range between 0 to 0.1 meters. In some implementations, the second thickness T2 may be in the range 0 to 0.075 meters. In some implementations, the second thickness T2 may be in the range 0 to 0.05 meters. In some implementations, the second thickness T2 may be in the range 0 to 0.01 meters. In some implementations, the second thickness T2 may be in the range 0 to 0.005 meters. In some implementations, the second thickness T2 may be in the range 0 to 0.001 meters. In some implementations, the second thickness T2 may be in the range 0.001 to 0.005 meters. In some implementations, the second thickness T2 may be in the range 0.005 to 0.01 meters.

In some implementations, the base container 102 may be a unitary structure. The unitary structure of the base container 102 may be formed by one or more of a weld, fashioned from a single piece of material, and/or other methods for forming a unitary structure between the components of the base container 102. The base plate 201, the set of sidewalls (such as the first sidewall 205, the second sidewall 202, the third sidewall 203, the forth sidewall 204, and/or other sidewalls), and/or other components may form a unitary structure. The unitary structure may be formed by one or more welds between the base plate 201 and/or the set of sidewalls, fashioned form a single piece of material, and/or other methods for forming a unitary structure.

Referring to FIG. 9, the first sidewall 205, the second sidewall 202, the third sidewall 203, and/or the forth sidewall 204 may traverse the base plate 201. In a non-limiting example, a first edge 205a of the first sidewall 205 may traverse a first base edge 201c of the base plate 201. A second edge 202a of the second sidewall 202 may traverse a second base edge 201b of the base plate 201. A third edge 203a of the third sidewall 203 may traverse a third base edge 201d of the base plate 201. A fourth edge 204a of the fourth sidewall 204 may traverse a fourth base edge 201a of the base plate 201. In some implementations, one or more edges (such as the first edge 205a of the first sidewall 205, the second edge 202a of the second sidewall 202, the third edge 203a of the third sidewall 203, and/or the fourth edge 204a of the forth sidewall 20) of the first sidewall 205, the second sidewall 202, the third sidewall 203, and/or the forth sidewall 204 may traverse the base plate 201 along the first surface 213a, and/or along other position of the base plate 201.

In a non-limiting example, referring still to base container 102 in FIG. 9, the base plate 201 may have a substantially rectangular shape with rounded corners. In some implementations, the first base edge 201c may be rounded and/or curved. The first edge 205a of the first sidewall 205 may traverse a portion of the first base edge 201c of base plate 201 defined by the second width W2. The second edge 202a of second sidewall 202 may traverse the second base edge 201b of base plate 201 defined by the first width W1. The third edge 203a of the third sidewall 203 may traverse a third base edge 201d defined by the first length L1. The fourth edge 204a of the fourth sidewall 204 may traverse a fourth base edge 201a defined by the fifth length L5. The one or more individual sidewalls and/or the base plate 201 may be positioned such an angle between any two surfaces may be in the range between 0-180 degrees, for example, 90 degrees.

In some implementations, the first sidewall 205 may traverse the third sidewall 203 and/or other components. The first sidewall 205, the third sidewall 203, and/or other components may form a unitary structure. In a non-limiting example, a first side edges 205b of the first sidewall 205 may traverse a second edge 203b of the third sidewall 203. The first side edge 205b of the first sidewall 205 and/or second side edge 203b of the third sidewall 203 may form a round edge 201e. The round edge 201e may be round and/or sharp. The first sidewall 205 and/or third sidewall may be positioned such an angle between any two surfaces may be in the range between 0-180 degrees, for example, 90 degrees. The third sidewall 203 may traverse the second sidewall 202 and/or other components. The third sidewall 203, the second sidewall 202, and/or other components may form a unitary structure. In a non-limiting example, a third side edge 203c of the third sidewall 203 may traverse the fourth side edge 202c of the second sidewall 202 and/or other components. The third side edge 203c of the third sidewall 203 and/or the fourth side edge 202c of the second sidewall 202 may form a round edge 201f. The round edge 201f may be round and/or sharp. The fifth side edge 202b of the second sidewall 202 may traverse the sixth side edge 204b of the forth sidewall 204 and/or other components. The fifth side edge 202b of the second sidewall 202 and/or the sixth side edge 224b of the forth sidewall 204 may form a round edge 201g. The round edge 201g may be round and/or sharp.

Figure 10:
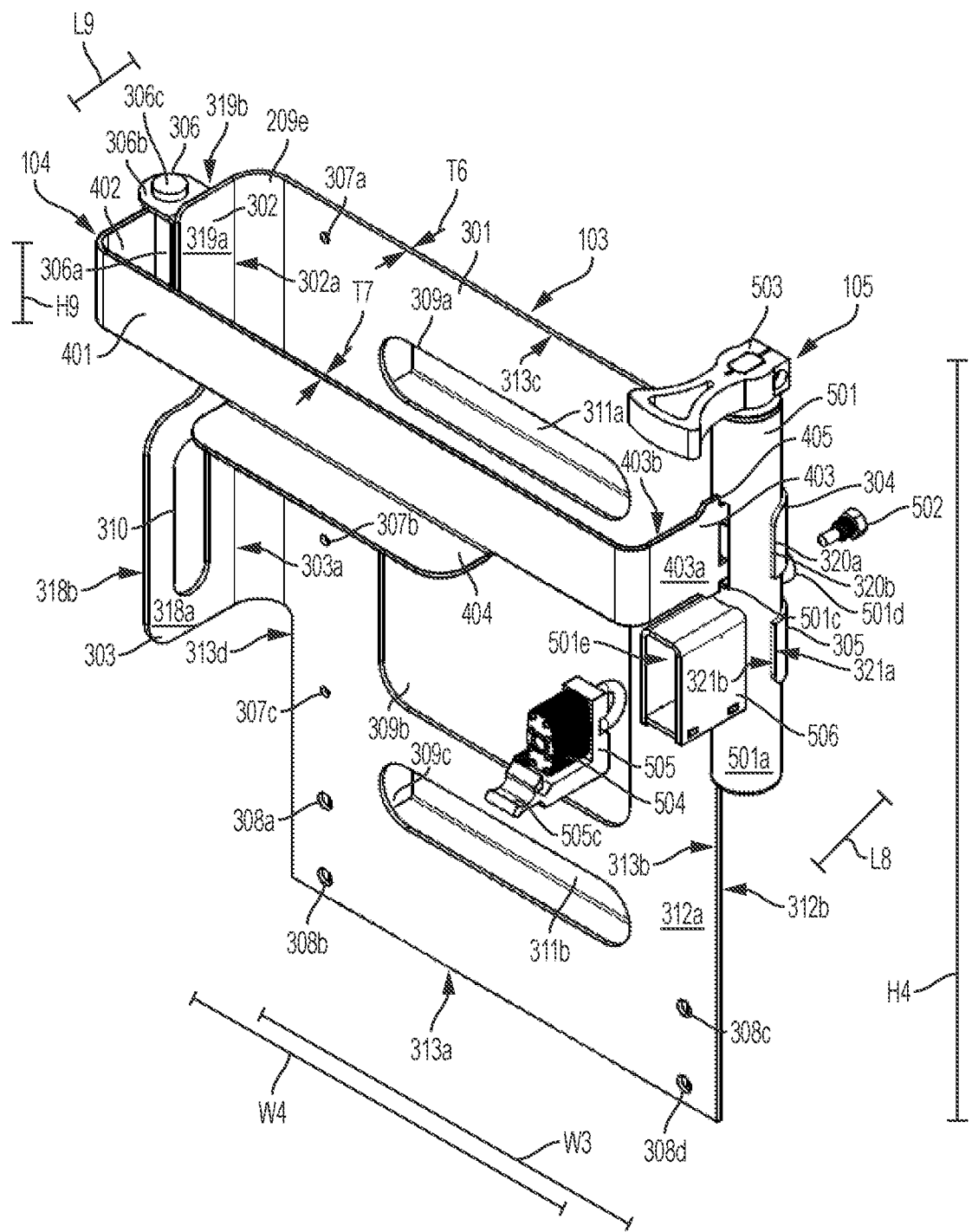
FIG. 10 is a three-dimensional diagram illustrating a rear support wall of the equipment rack of FIG. 1.

Referring to rear support wall 103 in FIG. 10, in some implementations, the rear support wall 103 may include a rear plate 301, a second set of sidewalls, one or more rotating hinges (such as a rotating hinge 306) for one or more rotatable locking arms (such as the rotatable locking arm 104), one or more locking mechanisms (such as the locking mechanism 105), one or more equipment clips (such as the equipment clip 106), and/or other components. The second set of sidewalls may include one or more individual sidewalls. The second set of sidewalls may include one or more of a fifth sidewall 302, a sixth sidewall 303, a seventh sidewall 304, an eighth sidewall 305 and/or other sidewalls. The rear support wall 103 may be coupled to at least one individual sidewall in the first set of sidewalls (such as the second sidewall 202 and/or other sidewalls) of the base container 102. The rear support wall 103 may traverse the base container 102 in a first direction. The first direction being the direction normal to the first surface 213a.

In some implementations, the rear support wall 103 may form a partial enclosure configured to partially restrain and/or enclose the equipment 107. The one or more of the individual sidewalls in the second set of sidewalls, the rotating hinge 306, the locking mechanism 105, and/or other components may traverse a perimeter of the rear plate 301 and/or other components. The rear plate 301, the individual sidewalls in the second set of sidewalls, the rotating hinge 306, the locking mechanism 105, and/or other components may be joined together to form the partial enclosure. The partial enclosure formed such that rotation of the equipment 107 relative the rear support wall 103 and/or other components may be restricted with respect to one or more axes of rotation. In a non-limiting example, the rear support wall 103 may prevent the equipment 107 from rotating in the longitudinal axis, the latitudinal axis, and/or other axis when the equipment 107 is within the rear support wall 103. The rear support wall 103 may prevent the equipment 107 from rotating in any axis of rotation.

Still referring to rear support wall 103 in FIG. 10, in some implementations, the rear plate 301 may comprise a solid body having one or more surfaces and/or one or more edges. The one or more edges may include as a fifth base edge 313a, a sixth base edge 313b, a seventh base edge 313c, an eighth base edge 313d, and/or other edges. The one or more surfaces may include one or more of an eleventh surface 312a, a twelfth surface 312b opposite the eleventh surface 312a, and/or other surfaces of the rear plate 301. The solid body may form a shape, such as a rectangular shape, a triangular shape, a circular shape, and/or other shapes. In some implementations, the one or more edges (such as the fifth base edge 313a, the sixth base edge 313b, the seventh base edge 313c, and/or the eighth base edge 313d) of the solid body of the rear plate 301 may be round and/or sharp. The rear plate 301 may be made of one or more materials. In a non-limiting example, the one or more materials may include one or more of materials may include one or more of metal, wood, plastic, carbon fiber, and/or other materials.

In some implementations, the rear plate 301 may be sized to support and/or enclose the equipment 107. In a non-limiting example, the rear plate 301 may be defined by one or more of a third width W3, a fourth height H4, a sixth thickness T6 and/or other measurements. In some implementations. the fourth height H4 may be in the range 0 to 1 meters. In some implementations. the fourth height H4 may be in the range 0 to 0.75 meters. In some implementations. the fourth height H4 may be in the range 0 to 0.5 meters. In some implementations. the fourth height H4 may be in the range 0 to 0.25 meters. In some implementations. the fourth height H4 may be in the range 0.25 to 0.5 meters. In some implementations. the fourth height H4 may be in the range 0.4 to 0.5 meters. In some implementations, the sixth thickness T6 may be in the range 0 to 0.1 meters. In some implementations, the sixth thickness T6 may be in the range 0 to 0.075 meters. In some implementations, the sixth thickness T6 may be in the range 0 to 0.05 meters. In some implementations, the sixth thickness T6 may be in the range 0 to 0.01 meters. In some implementations, the sixth thickness T6 may be in the range 0 to 0.005 meters. In some implementations, the sixth thickness T6 may be in the range 0 to 0.001 meters. In some implementations, the sixth thickness T6 may be in the range 0.001 to 0.005 meters. In some implementations, the sixth thickness T6 may be in the range 0.005 to 0.01 meters. In some implementations, the third width W3 may be in the range 0 to 1 meters. In some implementations, the third width W3 may be in the range 0 to 0.75 meters. In some implementations, the third width W3 may be in the range 0 to 0.5 meters. In some implementations, the third width W3 may be in the range 0 to 0.25 meters. In some implementations, the third width W3 may be in the range 0.25 to 0.4 meters. In some implementations, the third width W3 may be in the range 0.4 to 0.5 meters.

In some implementations, the solid body of the rear plate 301 may include a third set of openings. The third set of openings may include one or more of opening 307a, opening 307b, opening 307c, opening 308a, opening 308b, opening 308c, opening 308d, opening 309a, opening 309b, opening 309c, and/or other openings. The individual openings in the third set of openings may communicate through the solid body of the rear plate 301 from the eleventh surface 312a to the twelfth surface 312b. The individual openings in the third set of openings may be located within the boundaries and/or perimeter of the rear plate 301. The individual openings in the third set of openings may include one or more of one or more cutaways, one or more apertures, and/or other openings. The individual openings in the third set of openings may have individual shapes. One or more of openings 307a, opening 307b, opening 307c, and/or other openings may be used to couple the rear plate 301 to the equipment clip 106. One or more of opening 308a, opening 308b, opening 308c, opening 308d, and/or other openings may be used to couple the rear plate 301 to the second sidewall 202. One or more of opening 308d, opening 309a, opening 309b, opening 309c, and/or other openings may be used facilitate air ventilation and/or provide other purposes. In some implementations, the opening 309a and/or opening 309c may be the same shape and/or size.

In some implementations, the individual openings in the third set of openings may be configured to receive one or more of one or more fasteners, and/or other coupling devices. In some implementations, the individual openings in the third set of openings may be configured to facilitate one or more of a coupling between rear plate 301 and/or one or more support surfaces, components, equipment, and/or other objects. In some implementations, individual openings in the third set of openings may be configured to reduce the weight of the rear plate 301 and/or provide other purposes.

In some implementations, one or more of the openings 307a, opening 307b, opening 307c, opening 308a, opening 308b, opening 308c, opening 308d, opening 309a, opening 309b, opening 309c, and/or other openings may be aligned on the rear plate 301 in one or more patterns. In a non-limiting example, one or more of the openings 307a, opening 307b, opening 307c, opening 308a, opening 308b, opening 308c, opening 308d, opening 309a, opening 309b, opening 309c, and/or other openings may be aligned in one or more of a circular pattern, angular pattern, rectangular pattern, and/or other patterns. one or more of the openings 307a, opening 307b, opening 307c, opening 308a, opening 308b, opening 308c, opening 308d, opening 309a, opening 309b, opening 309c, and/or other openings may be aligned along the edges and/or close to the edges of the rear plate 301.

In some implementations, one or more of the openings 307a, opening 307b, opening 307c, opening 308d, opening 309a, opening 309b, opening 309c, and/or other openings may be configured to facilitate one or more couplings between the rear plate 301 and/or one or more components of the equipment rack 100 (such as the second sidewall 202 and/or the equipment clip 106). The rear plate 301 may be coupled with one or more components of the equipment rack 100 by one or more of one or more fasteners, one or more adhesives, and/or other coupling devices and/or chemicals. In a non-limiting example, the rear plate 301 may be coupled to the base container 102 from the second sidewall 202 and/or other components.

Figure 8:
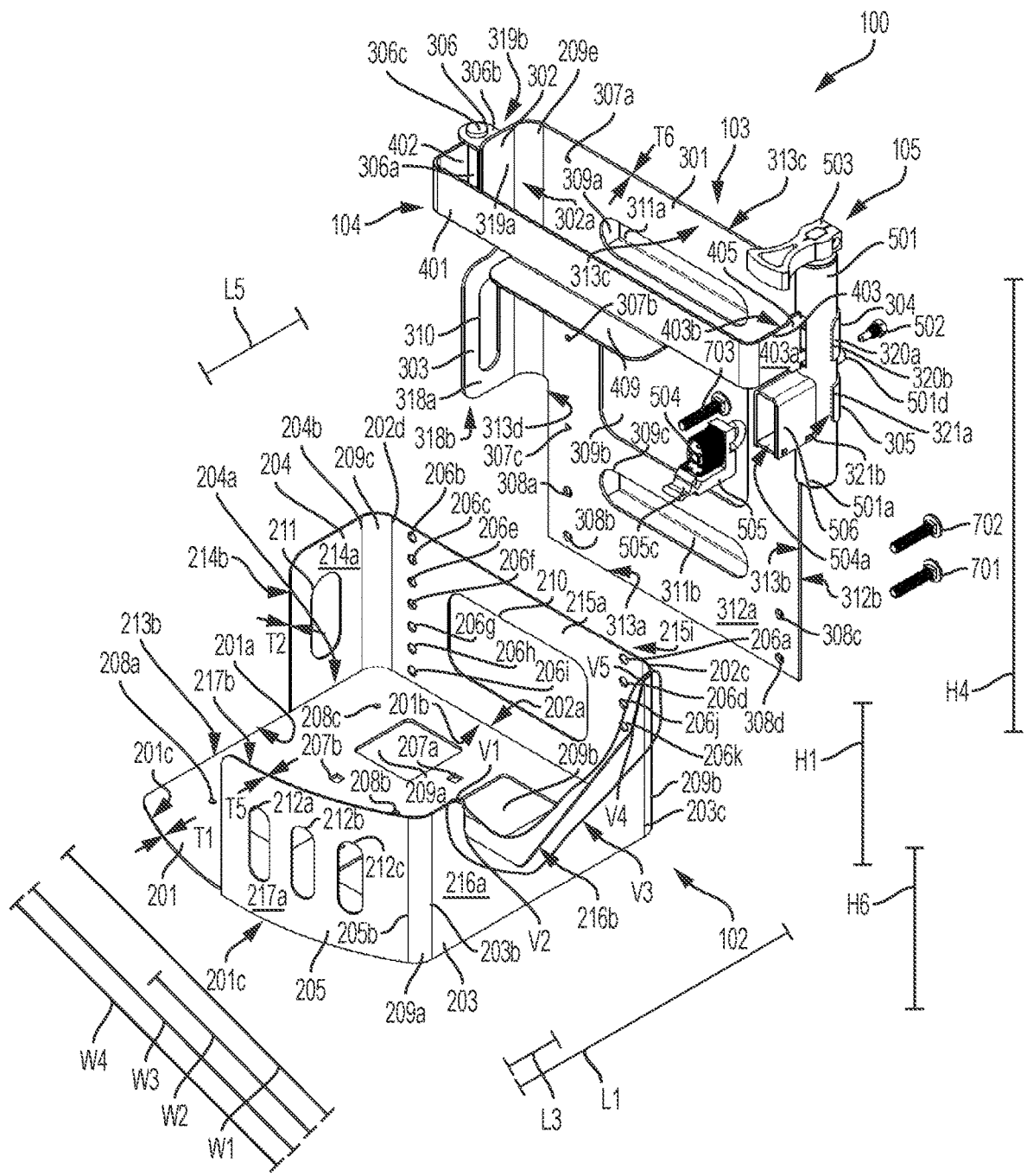
FIG. 8 is a three-dimensional diagram illustrating a first isometric view of the components of the equipment rack of FIG. 1 uncoupled from one another.

Referring to FIG. 8, in a non-limiting example, the opening 308a and/or opening 308b of the rear plate 301 may align with the opening 206b, opening 206c, opening 206e, opening 206f, opening 206g, opening 206h, and/or opening 206i of the second sidewall 301. The opening 308c and/or opening 308d of the rear plate 301 may align with the opening 206a, opening 206c, opening 206j, opening 206k, opening 206L, and/or opening 206m of the second sidewall 301. The alignment with the one or more openings between the rear plate 301 and the second sidewall 202 may facilitate the coupling between the rear plate 301 and/or the second sidewall 202.

Referring to the equipment rack 100 in FIG. 8, in some implementations, position of the rear support wall 103 relative to the base container 102 may be determined by the alignment of the one or more openings of the rear plate 301 and second sidewall 202. The equipment rack 100 may be configured to accommodate, restrain, enclose, and/or secure different pieces of equipment based different position of the rear support wall 103 relative to the base container 102. For example, the base container 102 and/or rear support wall 103 may be adjusted such that the distance between the base plate 201 and a top edge (such as edge 313c) of rear plate 301 may increase or decrease. Referring to FIG. 8, in a non-limiting example, the one or more alignment of the opening 308a to opening 206b, opening 208b to opening 206c, opening 208c to opening 206a, and/or opening 208d to opening 206d may define a first position. The one or more alignment of the opening 308a to opening 206h, opening 208b to opening 206i, opening 208c to opening 206m, and/or opening 208d to opening 206n may define a second position. Other alignment of the one or more openings of the rear sidewall 202 and/or rear plate 301 may define other position.

Figure 4:
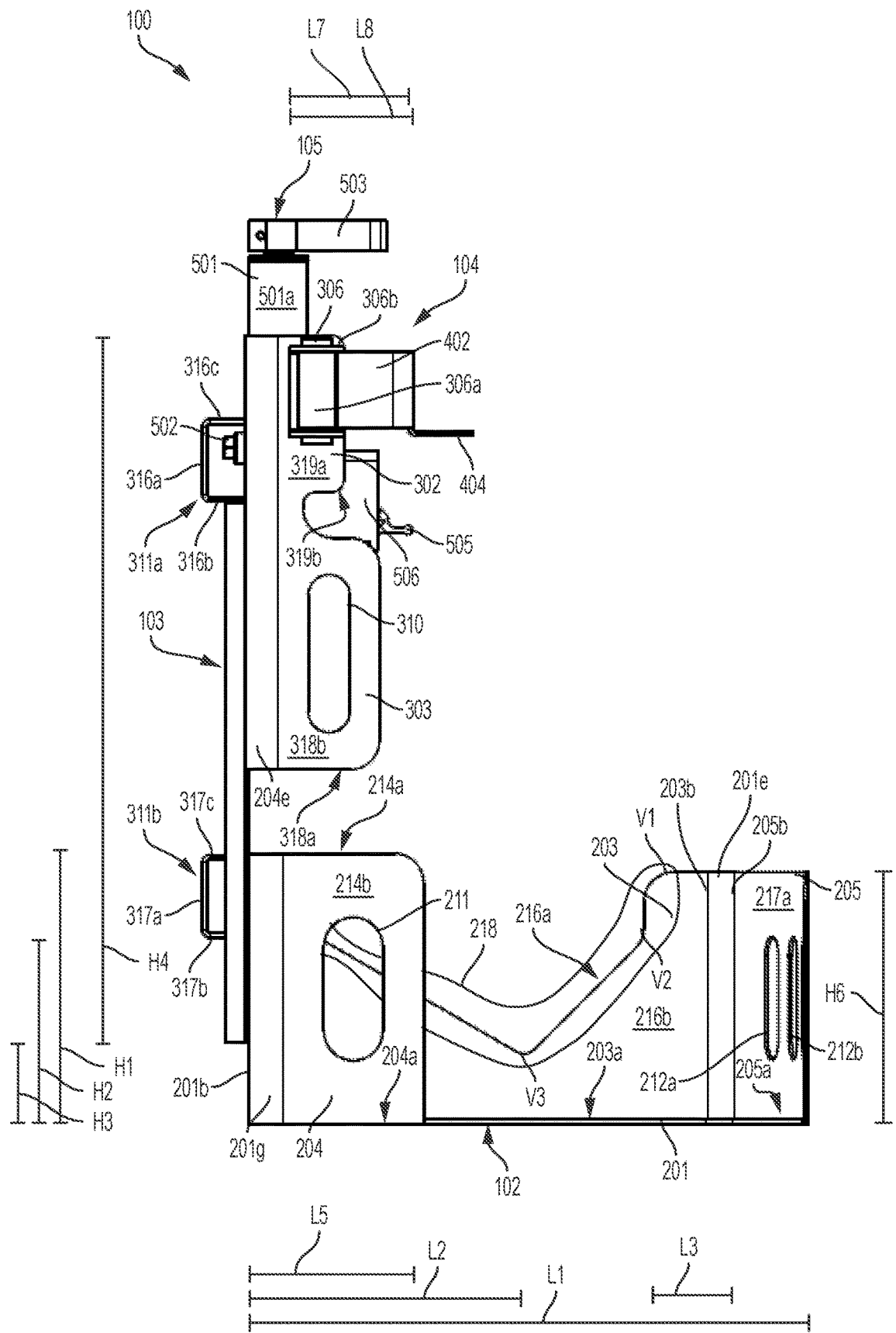
FIG. 4 is an illustration of a second side view of the equipment rack of FIG. 1.
Figure 5:
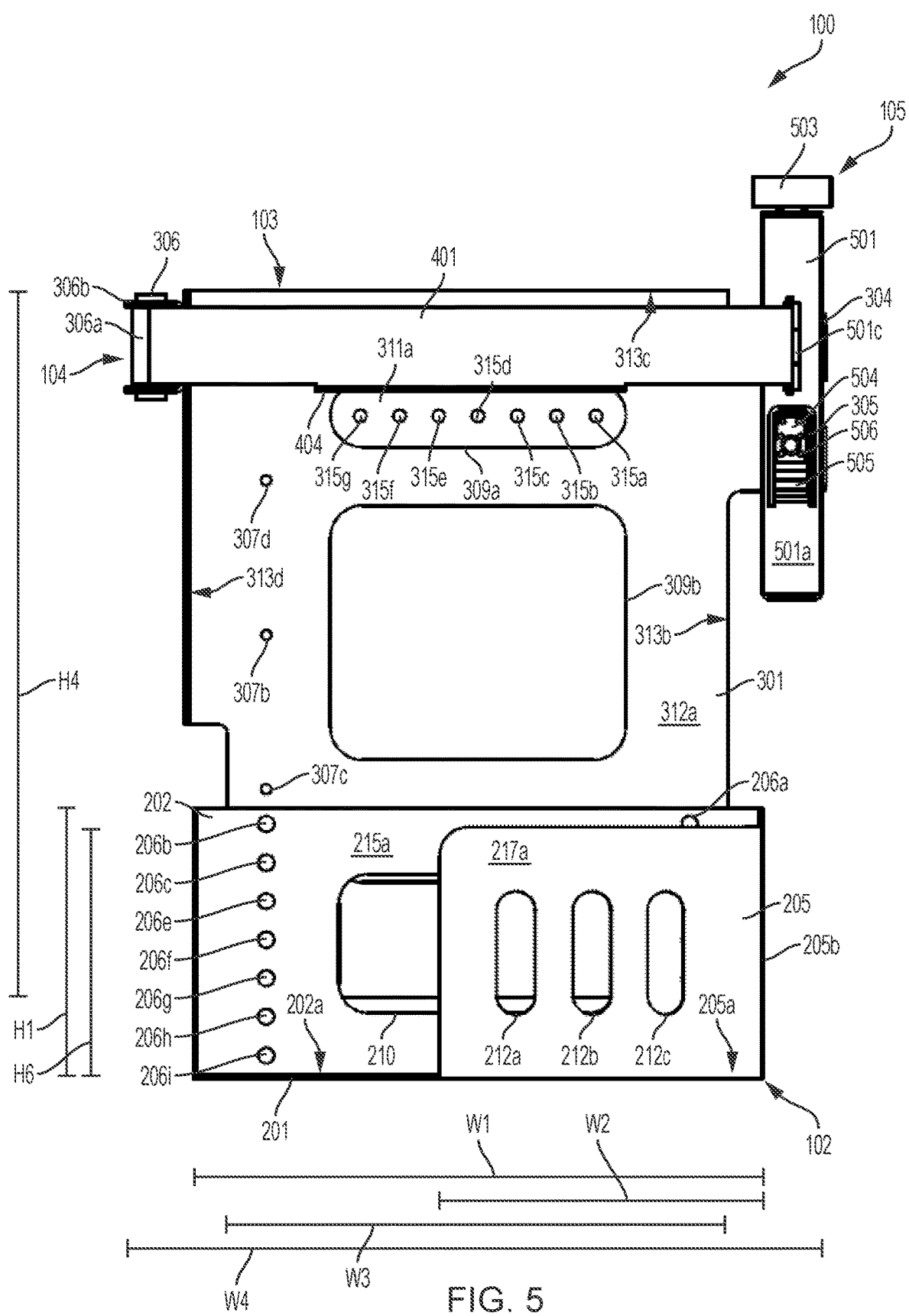
FIG. 5 is an illustration of a front view of the equipment rack of FIG. 1.
Figure 6:
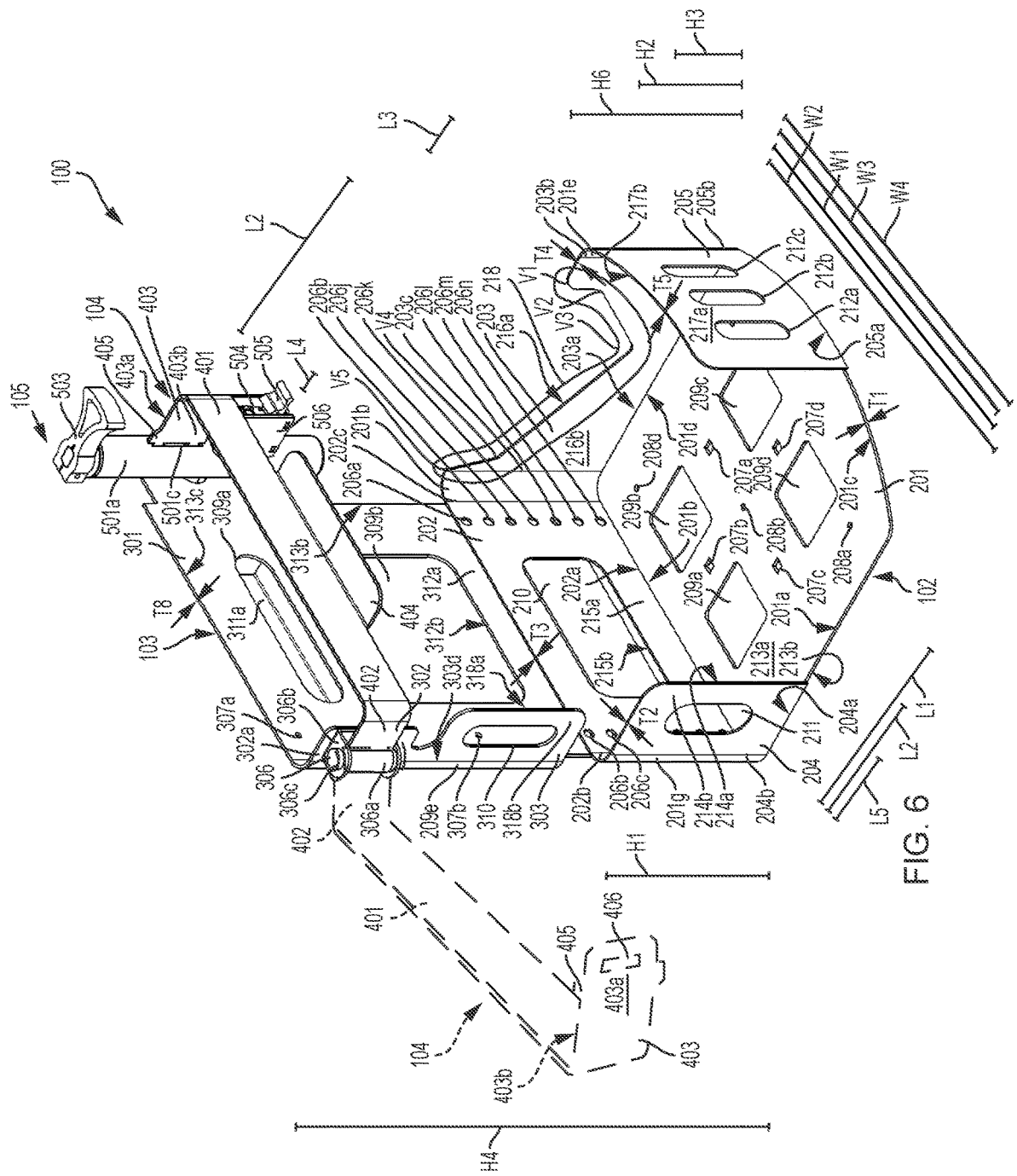
FIG. 6 is a three-dimensional diagram illustrating a second isometric view of the equipment rack of FIG. 1 with the rotatable locking arm in the locked position, and an illustration of the rotatable locking arm in the opened position.

Referring back to the rear plate 301 in FIG. 4, in some implementations, the rear plate 301 may include one or more rear protrusions configured mount the rear plate 301 to one or more walls, railings, and/or other surfaces and/or objects. The one or more rear protrusions may include one or more of a rear protrusions 311a, a rear protrusions 311b, and/or other rear protrusions. The rear protrusions 311a may include one or more of a first mounting plate 316a, a first mounting plate member 316b, and/or a second mounting plate member 316c. The first mounting plate member 316b may traverse the first mounting plate 316a and/or the rear plate 301 along the twelfth surface 312b. The second mounting plate member 316c may traverse the first mounting plate 316a and/or the rear plate 301 along the twelfth surface 312b. The first mounting plate member 316b and/or second mounting plate member 316c may be perpendicular to the twelfth surface 312b and/or the first mounting plate 316a. The first mounting plate 316a may be positioned over the opening 309a such that the opening 309a may provide access to the first mounting plate 316a. The rear protrusions 311b may include one or more of a second mounting plate 317a, a third mounting plate member 317b, and/or a fourth mounting plate member 317c. The second mounting plate member 317b may traverse the first third plate 317a and/or the rear plate 301 along the twelfth surface 312b. The fourth mounting plate member 317c may traverse the second mounting plate 317a and/or the rear plate 301 along the twelfth surface 312b. The third mounting plate member 317b and/or fourth mounting plate member 317c may be perpendicular to the twelfth surface 312b and/or the second mounting plate 317a. The second mounting plate 317a may be positioned over the opening 309b such that opening 309b may provide access to the second mounting plate 317a.

The rear protrusions 311a and/or rear protrusions 311b may include a fourth set of openings. The fourth set of openings may include one or more of an opening 315a, an opening 315b, an opening 315c, an opening 315d, an opening 315e, an opening 315f, an opening 315g and/or other openings. The individual openings in the fourth set of openings may be located within the boundaries and/or perimeter of the first mounting plate 316a. The individual openings in the fourth set of openings may include one or more of one or more cutaways, one or more apertures, and/or other openings. The fourth set of openings may have individual shapes. The individual openings in the fourth set of openings may be configured to receive one or more of one or more fasteners, and/or other coupling devices. In some implementations, the individual openings in the fourth set of openings may be configured to mount the rear plate 301 to one or more of a wall, a railing, and/or other objects. Similar openings of the individual openings in the fourth set of openings may be included within the boundaries and/or perimeter of the second mounting plate 317a.

In some implementations, the rear plate 301 may be configured to be coupled to one or more support surfaces and/or other objects. In a non-limiting example, the rear plate 301 may be coupled to the one or more support surfaces by one or more of one or more fasteners, one or more adhesives, and/or other coupling devices and/or chemicals.

Still referring to rear support wall 103 in FIG. 10, in some implementations, the individual sidewalls in the second set of sidewalls may be configured to support one or more sides of the equipment 107 (not shown in FIG. 10). The individual sidewalls in the second set of sidewalls may be configured to prevent access to one or more sides of the equipment 107. The individual sidewalls in the second set of sidewalls may enclose one or more sides of the equipment 107. The individual sidewalls in the second set of sidewalls may be made of one or more materials. In a non-limiting example, the one or more materials may include one or more of one or more metal, plastic, wood, fiber, and/or materials.

In some implementations, the individual sidewalls in the second set of sidewalls comprise individual solid body having one or more surfaces and/or one or more edges. The one or more surfaces may include one or more of a thirteenth surface 318a, a fourteenth surface 318b, a fifteenth surface 319a, a sixteenth surface 319b opposite the fifteenth surface 319a, a seventeenth surface 320a, an eighteenth surface 320b opposite the eighteenth surface 320b, a nineteenth surface 321a, twentieth surface321b opposite the nineteenth surface 321a, and/or other surfaces. The one or more edges may include one or more of a fifth edge 302a, a sixth edge 303a, and/or other edges. The solid body may form a shape, such as a rectangular shape, a triangular shape, a circular shape, and/or other shapes. The fifth sidewall 302 may include the fifteenth surface 319a and the sixteenth surface 319b. The sixth sidewall 303 may include the thirteenth surface 318a and the fourteenth surface 318b. The seventh sidewall 304 may include the seventeenth surface 320a and the eighteenth surface 320b. The eighth sidewall 305 may include the nineteenth surface 321a and twentieth surface 321b.

In some implementations, the solid body of the of the sixth sidewall 303 may include one or more openings. The one or more openings may include one or more of opening 310, and/or other openings. In some implementations, the opening 310 may be located within the boundaries and/or perimeter of the one or more surfaces of the sixth sidewall 303. The opening 310 may include one or more of one or more cutaways, one or more apertures, and/or other openings. The opening 310 may have individual shapes. In some implementations, the opening 310 may be configured to facilitate air for ventilation and/or provide other purposes. In some implementations, the opening 310 may be configured to reduce the weight of the sixth sidewall 303 and/or provide other purposes.

Referring still to FIG. 10, in some implementations, the fifth sidewall 302, the seventh sidewall 304, and/or the eighth sidewall 305 may be coupled to one or more components of the equipment rack 100 (such as the rotating hinge 306 and/or locking mechanism 105). The fifth sidewall 302 may be coupled to the rotating hinge 306. The seventh sidewall 304 and/or eighth sidewall 305 maybe coupled to the locking mechanism 105. The fifth sidewall 302, the seventh sidewall 304, and/or the eighth sidewall 305 may be coupled with one or more of the rotating hinge 306, locking mechanism 105, and/or other components of the equipment rack 100 by one or more of one or more fasteners, one or more adhesives, and/or other coupling devices and/or chemicals.

The individual sidewalls in the second set of sidewalls may traverse the rear plate 301. In a non-limiting example, the fifth edge 302a of the fifth sidewall 302 may traverse the eighth base edge 313d of the rear plate 301. The sixth edge 303a of the sixth sidewall 303 may traverse the eighth base edge 313d of the rear plate 301. The seventh sidewall 304 and/or the eighth sidewall 305 may traverse the sixth base edge 313b of the rear plate 301.

In some implementations, the components of the rear support wall 103 (such as individual sidewalls in the second set of sidewalls, the rotating hinge 306, the locking mechanism 105, and/or other components) may form a unitary structure. The unitary structure of the rear support wall 103 may be formed by one or more of a weld, fashioned from a single piece of material, and/or other methods for forming a unitary structure between the components of the rear support wall 103. The unitary structure may be formed by one or more welds between the rear plate 301 and the individual sidewalls in the second set of sidewalls, fashioned from a single piece of material, and/or other methods for forming a unitary structure.

Referring still to FIG. 10, in some implementations, the fifth edge 302a of the fifth sidewall 302 and/or the sixth edge 303a of or the sixth sidewall 303 may traverse the rear plate 301 along the eighth base edge 313d of the rear plate 301 to form one or more round edges. The one or more round edges may include one or more of a fifth-round edge 209e, and/or other round edges. The fifth sidewall 302 and the sixth sidewall 303 may share the same fifth-round edge 209e. The seventh sidewall 304, and/or the eighth sidewall 305 may one or more round edges similar to the fifth-round edge 209e. The seventh sidewall 304 and the eighth sidewall 305 may share the same round edge similar to fifth-round edge 209e. The individual sidewalls in the second set of sidewalls and/or the rear plate 301 may be positioned such an angle between any two surfaces may be in the range between 0-180 degrees, for example, 90 degrees. The round edges can be rounded or sharp.

Still referring to FIG. 10, in some implementations, the rotating hinge 306 may be configured to facilitate rotatable movement of the rotatable locking arm 104. The rotatable locking arm 104 may rotate to engage with locking mechanism 105 and/or other components. The rotating hinge 306 may include one or more end members configured to move about one or more of one or more joints and/or other rotational devices and/or components. The one or more end members may include one or more of a first hinge member 306a, a second hinge member 306b, and/or other end members. The one or more joints may include one or more of a joint 306c, and/or other joints. The first hinge member 306a and/or the second hinge member 306b may rotate about the joint 306c. In a non-limiting example, the first hinge member 306a and the second hinge member 306b may rotate about the joint 306c at the range between 0-270 degrees, for example, 90 degrees. Rotation may be accomplished in other directions and/or orientations by adjusting the relative positions of the one or more rotating hinges (such as a rotating hinge 306), one or more rotatable locking arms (such as the rotatable locking arm 104), and/or one or more locking mechanisms (such as the locking mechanism 105).

In some implementation, the first hinge member 306a may be coupled to the fifth sidewall 302. The first hinge member 306a traverse the sixteenth surface 319b. The second hinge member 306b may be coupled with a portion of or the entire rotatable locking arm 104. In a non-limiting example, the first hinge member 306a may rotate relative to the second hinge member 306b about the joint 306c and/or other rotational devices, such that the rotatable locking arm 104 may rotate relative to the first sidewall 302.

Referring to rotatable locking arm 104 in FIG. 7, in some implementations, the rotatable locking arm 104 may be configured to restrain and/or enclose a portion of the equipment 107. The rotatable locking arm 104 may restrain and/or enclose a portion of the equipment 107 in a restrained position within a space between the rotatable locking arm 104, the rear support wall 103, and/or other components (such as the base container 102). In the restrained position, removal of the equipment 107 from the rotatable locking arm 104, the rear support wall 103, and/or other components of the equipment rack 100 may be restricted.

Referring back to FIG. 10, in some implementations, the rotatable locking arm 104 may include one or more of a central member 401, one or more secondary members, and/or other components. The one or more secondary members may include one or more of a first end member 402, a second end member 403, a first mid-member 404, and/or other secondary members. The first end member 402, the second end member 403, and/or the first mid-member 404 may traverse the central member 401.

In some implementations, the central member 401, one or more secondary members, and/or other components may comprise a solid body having one or more surfaces and/or one or more edges. The one or more surfaces may include one or more of a twenty-first surface 403a, a twenty-second surface 403b opposite the twenty-first surface 403a, and/or other surfaces. The solid body may form a shape, such as a rectangular shape, a triangular shape, a circular shape, and/or other shapes. The central member 401, one or more secondary members, and/or other components may be made of one or more materials. In a non-limiting example, the one or more materials may include one or more of materials may include one or more of metal, wood, plastic, carbon fiber, and/or other materials.

In some implementations, the second end member 403 may include one or more protrusions. The one or more protrusions may one or more of a member protrusion 405, and/or other protrusions. The member protrusion 405 may be configured to restrict portions of the second end member 403 from being inserted into one or more openings or receptacles. In a non-limiting illustration, the member protrusion 405 may prevent portions of the second end member 403 from being inserted into the locking mechanism 105.

In some implementations, the second end member 403 may include a fifth set of openings. The fifth set of openings may include one or more of an opening 406 and/or other openings. In some implementations, the individual openings in the fifth set of openings may be located within the boundaries and/or perimeter of the second end member 403. The individual openings in the fifth set of openings may include one or more of one or more cutaways, one or more apertures, and/or other openings. In some implementations, the individual openings in the fifth set of openings may be configured to engage with the locking mechanism 105. The individual openings in the fifth set of openings may communicate through the solid body of the second end member 403 from the twenty-first surface 403a to the twenty-second surface 403b.

In some implementations, the individual openings in the fifth set of openings may be aligned across the surfaces of the second end member 403 in one or more patterns. In a non-limiting example, the one or more patterns may include in one or more of a circular pattern, angular pattern, rectangular pattern, and/or other patterns.

In some implementations, the central member 401, one or more secondary members, and/or other components may form a unitary structure. The unitary structure may be formed by one or more welds between central member 401, one or more secondary members, and/or other components, fashioned from a single piece of material, and/or other methods for forming a unitary structure.

In some implementations, the one or more secondary members may traverse the central member 401, and/or other components. The intersection and/or side edge of central member 401, the first end member 402, the second end member 403, the first mid-member 404 may rounded and/or sharp. In a non-limiting example, in FIG. 10, the rotatable locking arm 104 may have the first end member 402 may be disposed orthogonal to the central member 401. The second end member 403 opposite to the first end member 402 may be disposed orthogonal to a central member 401. The first mid-member 404 may be disposed orthogonal to the midsection of the central member 401. The first end member 402 may be coupled to a first hinge member 306a. The second end member 403 may comprise a complementary locking mechanism 105. The second end member 403 may include the opening 406 configured to cooperatively engage with the complementary locking mechanism 105 to define a locked position of the rotatable locking arm 104. The rotatable locking arm 104 in the locked position being configured to restrain and/or enclose a portion of the equipment in a space between the rotatable locking arm 104 and/or the rear support wall 103 such that removal of the equipment from the rear support wall 103, base container 102, and/or other components may be restricted.

In some implementations, the rotatable locking arm 104 may be sized to restrain and/or enclose the equipment 107 (not shown in FIG. 10). In a non-limiting example, the central member may be defined by a fourth width W4, a ninth height length H9, a seventh thickness T7 and/or other measurements. The first end member 402 may be defined by the ninth height length H9, a seventh length L7, the seventh thickness T7 and/or other measurements. The second end member 403 may be defined by the ninth height length H9, an eighth length L8, the seventh thickness T7 and/or other measurements. In some implementations, the seventh length L7 may be in the range 0 to 0.5 meters. In some implementations, the seventh length L7 may be in the range 0 to 0.25 meters. In some implementations, the seventh length L7 may be in the range 0 to 0.15 meters. In some implementations, the seventh length L7 may be in the range 0 to 0.01 meters. In some implementations, the seventh length L7 may be in the range 0.01 to 0.015 meters. In some implementations, the seventh length L7 may be in the range 0.01 to 0.25 meters. In some implementations, the eighth length L8 may be in the range 0 to 0.1 meters. In some implementations, the eighth length L8 may be in the range 0 to 0.0.5 meters. In some implementations, the eighth length L8 may be in the range 0 to 0.25 meters. In some implementations, the eighth length L8 may be in the range 0 to 0.15 meters. In some implementations, the eighth length L8 may be in the range 0 to 0.01 meters. In some implementations, the eighth length L8 may be in the range 0.01 to 0.015 meters. In some implementations, the eighth length L8 may be in the range 0.01 to 0.25 meters. In some implementations, the ninth height length H9 may be in the range 0 to 0.5 meters. In some implementations, the ninth height length H9 may be in the range 0 to 0.25 meters. In some implementations, the ninth height length H9 may be in the range 0 to 0.1 meters. In some implementations, the ninth height length H9 may be in the range 0 to 0.05 meters. In some implementations, the ninth height length H9 may be in the range 0.05 to 0.1 meters. In some implementations, the ninth height length H9 may be in the range 0.08 to 0.1 meters. In some implementations, the seventh thickness T7 may be in the range 0 to 0.005 meters. In some implementations, the seventh thickness T7 may be in the range 0 to 0.01 meters. In some implementations, the seventh thickness T7 may be in the range 0 to 0.0075 meters. In some implementations, the seventh thickness T7 may be in the range 0 to 0.005 meters. In some implementations, the seventh thickness T7 may be in the range 0 to 0.0025 meters. In some implementations, the seventh thickness T7 may be in the range 0.0025 to 0.0075 meters. In some implementations, the fourth width W4 may be in the range 0 to 1 meters. In some implementations, the fourth width W4 may be in the range 0 to 0.75 meters. In some implementations, the fourth width W4 may be in the range 0 to 0.5 meters. In some implementations, the fourth width W4 may be in the range 0 to 0.25 meters. In some implementations, the fourth width W4 may be in the range 0.25 to 0.5 meters. In some implementations, the fourth width W4 may be in the range 0.4 to 0.5 meters.

Figure 11:
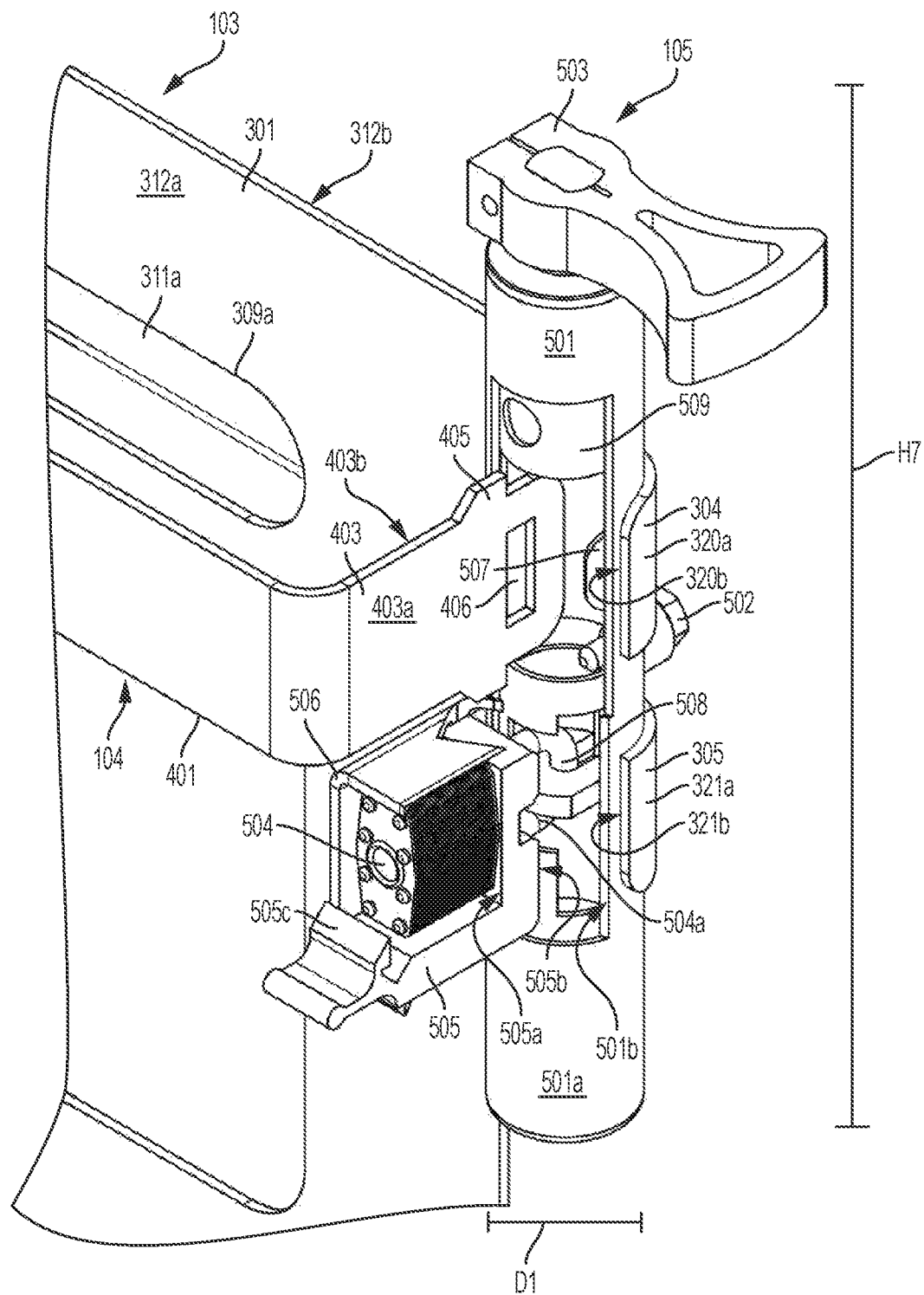
FIG. 11 is a three-dimensional diagram illustrating cutaway view of a locking mechanism of the equipment rack of FIG. 1 with the rotatable locking arm coupled with the locking mechanism in a locked position, and the locking mechanism in the unlocked position.
Figure 12:
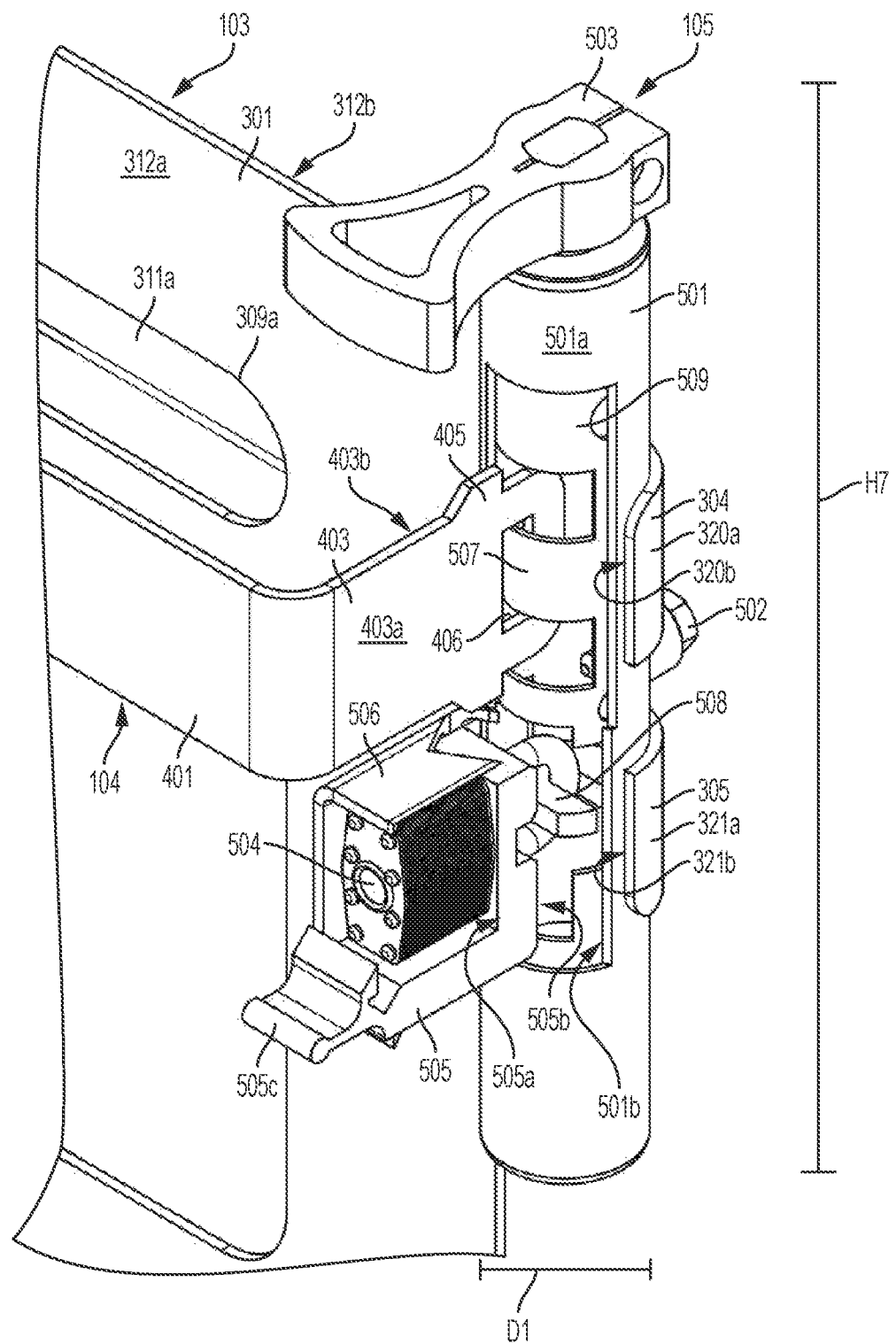
FIG. 12 is a three-dimensional diagram illustrating cutaway view of the locking mechanism of the equipment rack of FIG. 1 with the rotatable locking arm coupled with the locking mechanism in a locked position, and the locking mechanism in the locked position.

Referring to locking mechanism 105 in FIG. 10, in some implementation, the locking mechanism 105 may be configured to restrain and/or restrict the movement of the rotatable locking arm 104 and/or other components in a locked position. The rotatable locking arm 104 and/or other components may obtained the locked position when the one or more locking mechanisms 105 are engaged. Referring to FIG. 12, the locking mechanism 105 may be in the locked position to restrain and/or restrict the movement of the rotatable locking arm 104 and/or other components. Referring to FIG. 11, the locking mechanism 105 may be in an unlocked position.

Figure 13:
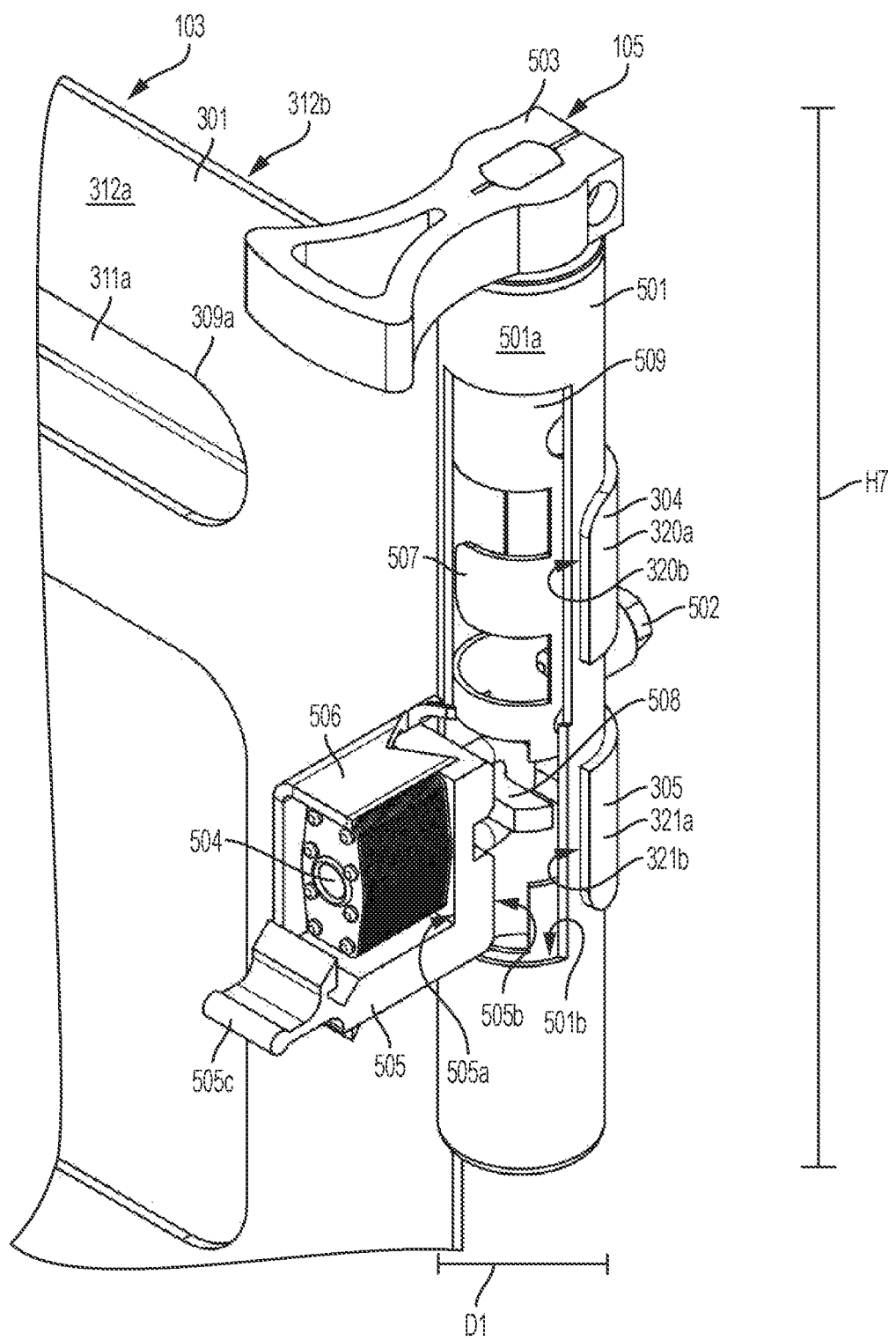
FIG. 13 is a three-dimensional diagram illustrating cutaway view of the locking mechanism of the equipment rack of FIG. 1 with the rotatable locking arm uncoupled with the locking mechanism in an opened position (the rotatable locking arm is not shown in FIG. 13), and the locking mechanism in the locked position.

Referring to FIG. 13, the locking mechanism 105 may include one or more of one or more outer shell housing (such as an outer shell housing 501), one or more of an internal locking mechanism (such as internal locking mechanism 509), one or more of a handle (such as handle 503), one or more rotation limiter bolt (such as rotation limiter bolt 502), one or more of a rotational restriction lock (such as rotational restriction lock 504), one or more rotational restriction lock attachment (such as rotational restriction lock attachment 505), and/or other components.

In some implementations, the outer shell housing 501 may comprise a solid body having one or more surfaces. The solid body may form a shape, such as a rectangular shape, a triangular shape, a cylinder, a cube, a cone, a sphere, a cuboid, and/or other shapes. The one or more surfaces may include one or more of a twenty-third surface 501a, a twenty-fourth surface 501b opposite the twenty-third surface 501a, and/or other surfaces.

Referring to FIG. 10, in some implementations, outer shell housing 501 may include a sixth set of openings. The sixth set of openings may include one or more of a opening 501c, opening 501d, opening 501e, and/or other openings. The individual openings in the sixth set of openings may be located within the boundaries and/or perimeter of the outer shell housing 501. The individual openings in the sixth set of openings may include one or more of one or more cutaways, one or more apertures, and/or other openings. The individual openings in the sixth set of openings may have individual shapes. The individual openings in the sixth set of openings may communicate through the solid body of the outer shell housing 501 from the twenty-third surface 501a to the twenty-fourth surface 501b. In some implementations, one or more of the opening 501c, and/or other openings may be a receptacle for the rotational restriction lock 504. One or more of the opening 501d, and/or other openings may be a receptacle for the rotation limiter bolt 502. One or more of the opening 501e, and/or other openings may be a receptacle for the rotational restriction lock 504 and/or rotational restriction lock attachment 505. One or more of the opening 501c, and/or other openings may be sized such that the member protrusion 405 restricts the entire second end member 403 from being inserted into the outer shell housing 501.

Referring to FIG. 13, in some implementations, the locking mechanism may be defined by one or more of a seventh height H7, a first diameter D1, and/or other measurements. In some implementations, the seventh height H7 may be in the range of 0 to 0.75 meters. In some implementations, the seventh height H7 may be in the range of 0 to 0.50 meters. In some implementations, the seventh height H7 may be in the range of 0 to 0.25 meters. In some implementations, the seventh height H7 may be in the range of 0 to 0.1 meters. In some implementations, the seventh height H7 may be in the range of 0.1 to 0.3 meters. In some implementations, the seventh height H7 may be in the range of 0.2 to 0.3 meters. In some implementations, the first diameter D1 may be in the range of 0 to 0.04 meters. In some implementations, the first diameter D1 may be in the range of 0 to 0.5 meters. In some implementations, the first diameter D1 may be in the range of 0 to 0.025 meters. In some implementations, the first diameter D1 may be in the range of 0 to 0.01 meters. In some implementations, the first diameter D1 may be in the range of 0.03 to 0.05 meters.

Still referring to FIG. 13, in some implementations, the internal locking mechanism 509 may fit within the outer shell housing 501. The internal locking mechanism 509 may have the similar shape as the outer shell housing 501. The internal locking mechanism 509 may move and/or rotate within the outer shell housing 501. The internal locking mechanism 509 may be rotated within the outer shell housing 501 by the handle 503 and/or other mechanism. The rotation limiter bolt 502 may be configured to limit the degree of rotation of the internal locking mechanism 509 within the outer shell housing 501. In a non-limiting example, the rotation limiter bolt 502 may be inserted into the outer shell housing 501 through opening 501d and/or other openings, the internal locking mechanism 509, and/or other components. The rotation limiter bolt 502 may limit the degree of rotation of the internal locking mechanism 509 within the outer shell housing 501 by catching the internal locking mechanism 509 at a certain rotation angle.

In some implementations, the internal locking mechanism 509 may include one or more latch mechanisms. The one or more latch mechanism may include one or more of a first latch 507, a second latch 508, and/or other latches. The one or more latch mechanism may latch onto the rotatable locking arm 104, the rotational restriction lock 504, and/or other components. The one or more latch mechanism may include one or more hooks, teeth, and/or other structures to latch onto components of the locking mechanism 105.

In some implementations, a rotation of the internal locking mechanism 509 within the outer shell housing 501 may engage the first latch 507 and/or the second latch 508. In a non-limiting example, referring to FIG. 12, a 90 degree first direction rotation of the internal locking mechanism 509 to the position shown in FIG. 12 may cause the first latch 507 to engage with the rotatable locking arm 104 and/or other components. The first latch 507 may restrict the movement of the rotatable locking arm 104 shown in FIG. 12. The 90 degree first direction rotation may be a clockwise direction and/or other directions. Referring to FIG. 11, a 90 degree second direction rotation of the internal locking mechanism 509 to the position shown in FIG. 11 may cause the first latch 507 to disengage with the rotatable locking arm 104 and/or other components. The first latch 507 may release the rotatable locking arm 104 and/or other components shown in FIG. 11. The 90 degree second direction rotation may be a counter clockwise direction and/or other directions. Not shown in the figures, a 180-degree rotation from the position showed in FIG. 11 may allow the rotational restriction lock 504 and/or other components to be disengaged from the second latch 508. The rotational restriction lock 504 may be uncoupled from the internal locking mechanism 509 when disengaged from the second latch 508. Other degree of rotation of the internal locking mechanism 509 may cause the one or more latch mechanisms to engage with other components. The rotation limiter bolt 502 may be inserted in the outer shell housing 501 to limit the rotational angle of the internal locking mechanism 509. In some implementations, the rotation limiter bolt 502 may limit the rotational angle of the internal locking mechanism 509 between 0 to 90 degrees. In some implementations, the rotation limiter bolt 502 may limit the rotational angle of the internal locking mechanism 509 between 0 to 60 degrees. In some implementations, the rotation limiter bolt 502 may limit the rotational angle of the internal locking mechanism 509 between 0 to 30 degrees. In some implementations, the rotation limiter bolt 502 may limit the rotational angle of the internal locking mechanism 509 between 30 to 60 degrees. In some implementations, the rotation limiter bolt 502 may limit the rotational angle of the internal locking mechanism 509 between 50 to 60 degrees. In some implementations, the removal of the rotation limiter bolt 502 from the outer shell housing 501 may allow the internal locking mechanism 509 to rotate between 0 to 270 degrees. In some implementations, the removal of the rotation limiter bolt 502 from the outer shell housing 501 may allow the internal locking mechanism 509 to rotate between 0 to 180 degrees. In some implementations, the removal of the rotation limiter bolt 502 from the outer shell housing 501 may allow the internal locking mechanism 509 to rotate between 0 to 135 degrees.

Figure 14:
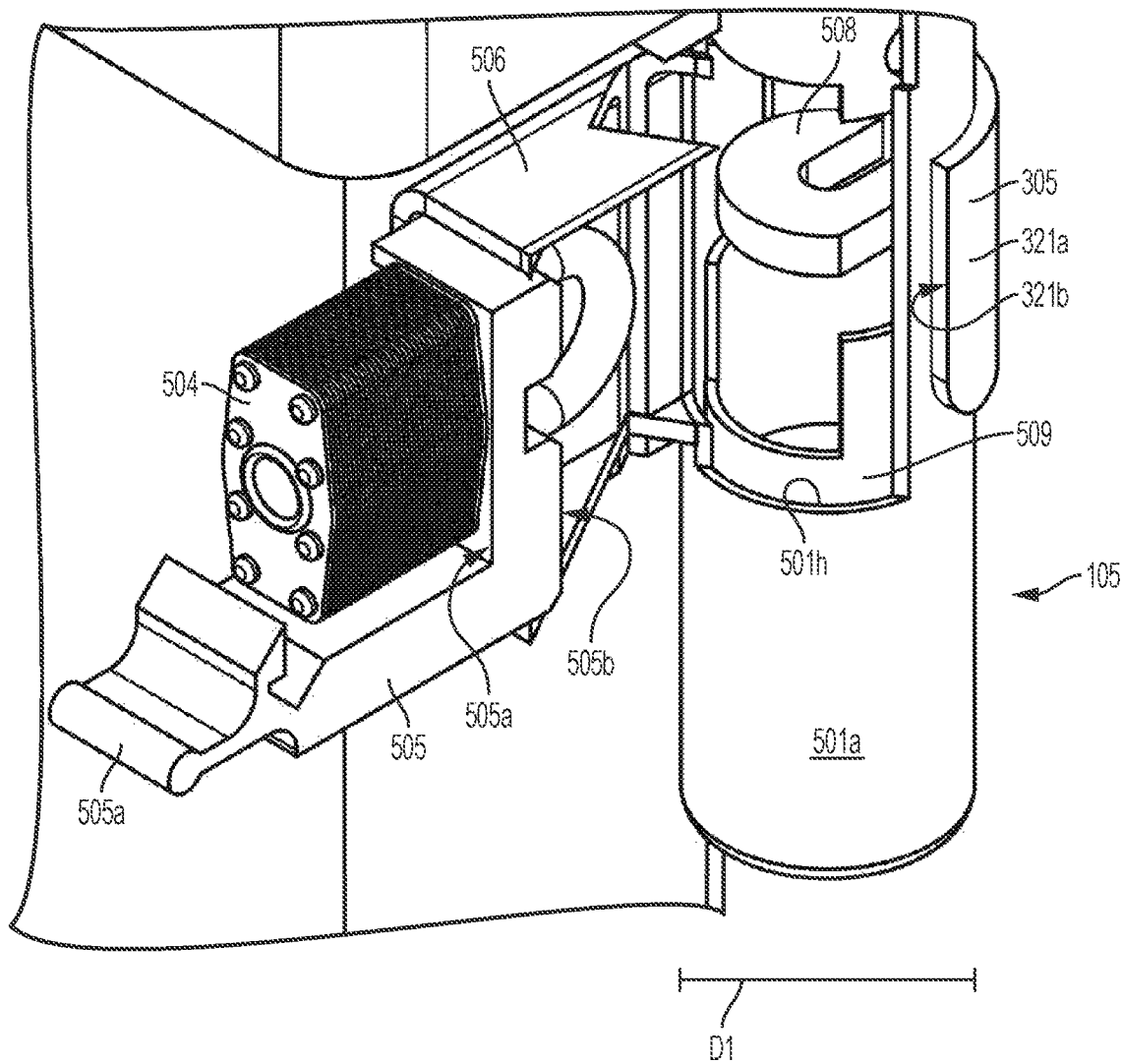
FIG. 14 is a three-dimensional diagram illustrating cutaway view of the locking mechanism of the equipment rack of FIG. 1 with a standard padlock uncoupled from the locking mechanism.

In some implementations, rotational restriction lock 504, rotational restriction lock attachment 505, and/or other components may be configured to restrict the movement of the internal locking mechanism 509. In some implementations, the rotational restriction lock 504 may be a standard padlock. The standard padlock may have a locked position and/or an unlocked position. Referring to FIG. 14, the rotational restriction lock 504 may be in an unlocked position. Referring to FIG. 12, the rotational restriction lock 504 and/or rotational restriction lock attachment 505 may restrict the movement of the internal locking mechanism 509 when the rotational restriction lock 504 is in a locked position. The rotational restriction lock attachment 505 may be configured to push against and/or restrain the internal locking mechanism 509 (specifically the second latch 508) when the rotational restriction lock 504 is in the locked position to restrict the movement of the internal locking mechanism 509. In some implementations, the rotational restriction lock 504s may restrict the movement of the internal locking mechanism 509 by latching onto the internal locking mechanism 509 (specifically the second latch 508) with the shackles. There may be other systems and/or methods for restricting the movement of the internal locking mechanism 509.

In FIG. 13, in some implementation, the rotational restriction lock attachment 505 comprise a solid body having one or more surfaces and/or one or more side edges. The one or more surfaces may include one or more of a twenty-fifth surface 505a, a twenty-sixth surface 505b opposite the twenty-fifth surface 505a, and/or other surfaces. The solid body may form a shape, such as a substantially L-shaped block and/or other shapes. The rotational restriction lock attachment 505 may include one or more openings for the shackles 504a of the rotational restriction lock 504. The one or more openings may include one or more of one or more cutaways, one or more apertures, and/or other openings. The one or more openings may have individual shapes. The rotational restriction lock attachment 505 may enclose a portion of or an entire rotational restriction lock 504 on one or more sides. The shackles 504a of may protrude out of the one or more openings of the rotational restriction lock attachment 505. The rotational restriction lock attachment 505 may include a teeth 505c restricting the rotational restriction lock 504 from sliding or moving in one or more directions. The teeth 505c may be located on the opposite end of the shackles 504a.

In some implementations, the outer lock housing 506 may be configured to enclose the rotational restriction lock 504, the rotational restriction lock attachment 505, and/or other components on one or more sides. The outer lock housing 506 may be traverse with the outer shell housing 501, along the twenty-third surface 501a. The outer lock housing 506 may sit above the opening 501e. The outer lock housing 506 and/or the outer shell housing 501 may form a unitary structure. The outer lock housing 506 may be configured such that the outer lock housing 506 may restrict access to the rotational restriction lock 504 and/or the rotational restriction lock attachment 505 on one or more sides when the rotational restriction lock 504 and/or the rotational restriction lock 504 is coupled to the lock mechanism 105.

Referring to FIG. 7, in some implementations, when the base container 102 is coupled to the rear support wall 103 and the equipment 107 is in the space between the rotatable locking arm 104, the rear support wall 103, and/or the base container 102, the removal of the base container 102 from rear support wall 103 may be restricted. The rotatable locking arm 104 may be in a locked position when the equipment 107 is in the space between the rotatable locking arm 104, the rear support wall 103, and/or the base container 102. The fasteners coupling the rear support wall 103 and base container 102 may be inaccessible when the equipment 107 is in the space between the rotatable locking arm 104, the rear support wall 103, and/or the base container 102.

Referring to equipment clip 106, in FIG. 1, in some implementations, the equipment clip 106 may be configured to hold one or more parts and/or pieces of the equipment 107 (not shown in FIG. 1). The equipment clip 106 may comprise a solid body having one or more surfaces and/or one or more side edges. The solid body may form a shape, such as substantially U-shaped and/or other. The one or more parts and/or pieces of the equipment 107 may be coupled to the equipment clip 106. The equipment clip 106 may enclose the one or more parts and/or pieces of the equipment 107 within the equipment clip 106 such that the removal of the one or more parts and/or pieces of the equipment 107 is restricted. The one or more parts and/or pieces of the equipment 107 may rest on top of the equipment clip 106. In some implementations, there may be one or more slots in the equipment clip 106 configured to hold the one or more parts and/or pieces of the equipment 107 (not shown in FIG. 1). For example, the equipment clip may be configured to hold a hose nozzle portion of the equipment 107, and/or other components of the equipment 107.

In some implementations, the equipment clip 106 may include one or more openings (such as opening 602). The opening 602 may include one or more of one or more cutaways, one or more apertures, and/or other openings. The one or more openings may have individual shapes. In some implementations, the opening 602 may be configured to receive one or more of one or more fasteners, and/or other coupling devices. In some implementations, the opening 602 may be configured to facilitate a coupling between the equipment clip 106 and/or the rear support wall 103 and/or other components. In a non-limiting example, an opening 602 may be configured to be aligned with openings 307a, opening 307b, opening 307c and/or other openings and/or secure the equipment clip 106 to rear support wall 103 by one of more fasteners. The equipment clip 106 may be coupled to components of the equipment rack 100 in facing an anterior and/or posterior direction. The equipment clip 106 may be coupled to components of the equipment rack 100 in facing a direction normal to the twelfth surface 312b.

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed is:

1. An equipment rack system, comprising:
a base container forming a partial enclosure, the base container including a bottom wall and a set of sidewalls, the partial enclosure formed by the base container being configured to at least partially enclose a piece of equipment, the set of sidewalls traversing the bottom wall along a perimeter of the bottom wall, wherein the bottom wall and the set of sidewalls are joined together to form the partial enclosure such that the equipment relative the base container when partially enclosed by the base container is prevented from freely rotating about all axes of rotation relative to the base container;
the set of sidewalls comprising a first sidewall, a second sidewall, a third sidewall, and a fourth sidewall, a first end of the first sidewall connected to a first end of the third sidewall, a second end of the third sidewall connected to a first end of the second sidewall, a second end of the second sidewall connected to a first end of the fourth sidewall, wherein a first face of the fourth sidewall is configured to face a first face of the third sidewall and a first face of the second sidewall is configured to face a first face of the first sidewall, wherein the bottom wall and the set of sidewalls of the base container are attached;
a rear support wall coupled to a second face of the second sidewall of the base container, the rear support wall traversing the base container in a first direction; and
a rotatable locking arm held by the rear support wall, the rotatable locking arm having a first end member directly coupled to a hinge operatively connected to the rear support wall, and a second end member configured to enter a locked position when the rotatable locking arm is rotated about the hinge from a first position to a second position, the locked position maintained by a padlock,
wherein the rear support wall forms a partial enclosure, the rear support wall including a second set of sidewalls, the hinge, and the rotatable locking arm joined together such that the equipment relative to the rear support wall when partially enclosed by the rear support wall is prevented from freely rotating about all axis of rotation relative to the base container.

2. The system of claim 1, further comprising:
the rear support wall includes a locking mechanism; and
the second end member of the rotatable locking arm comprises a complementary locking mechanism, the locking mechanism of the rear support wall and the complementary locking mechanism of the rotatable locking arm being configured to cooperatively engage to define the locked position of the rotatable locking arm, the rotatable locking arm in the locked position being configured to enclose a portion of the equipment in a space between the rotatable locking arm and the rear support wall such that removal of the equipment from the base container is restricted.

3. The system of claim 2, wherein the locking mechanism of the rear support wall includes an outer shell housing, an internal locking mechanism, a handle, a rotation limiter bolt, a rotational restriction lock, and a rotational restriction lock attachment.

4. The system of claim 3, wherein the outer shell housing includes a rotatable locking arm receptacle for receiving the rotatable locking arm, a rotation limiter bolt receptacle for receiving the rotation limiter bolt, and a lock receptacle for receiving the rotational restriction lock and the rotational restriction lock attachment.

5. The system of claim 3, wherein the rotation limiter bolt is configured to restrict the rotatable angle of the internal mechanism of the locking mechanism.

6. The system of claim 3, wherein the rotational restriction lock and the rotational restriction lock attachment restricts a movement of the internal mechanism of the locking mechanism when in the rotational restriction lock is in a locked position.

7. The system of claim 3, wherein a lock housing is configured to enclose the rotational restriction lock and the rotational restriction lock attachment, wherein the rotational restriction lock attachment restricts a movement of the locking mechanism when the padlock is in a locked position of the padlock.

8. The system of claim 2, wherein the complementary locking mechanism of the rotatable locking arm cooperatively engages with the rotatable locking arm to obtain a locked position of the rotatable locking arm.

9. The system of claim 8, wherein the locked position restrains a rotation of the rotatable locking arm.

10. The system of claim 1, wherein at least one of the sidewalls in the set of sidewalls of the base container have a substantial V-shaped cut out.

11. The system of claim 1, wherein the equipment rack system includes an equipment clip configured to hold parts of the equipment.

12. The system of claim 11, wherein the equipment clip is coupled to the rear support wall.

13. The system of claim 1, wherein the second sidewall of the set of sidewalls of the base container includes sets of openings configured to align with sets of openings of the rear support wall to facilitate the coupling between the rear support wall and the second sidewall of the base container.

14. The system of claim 13, wherein the position of the base container and the rear support wall is adjustable to accommodate different equipment dimensions.

15. The system of claim 14, wherein the position of the base container and the rear support wall are adjustable by changing the alignment of the openings of the rear support wall and the openings of the second sidewall of the base container.

16. The system of claim 1, wherein the base container is removable from the rear support wall.

17. The system of claim 1, wherein the partial enclosure formed by the base container restricts the removal of the base container from the rear support wall when the equipment is in the space between the rotatable locking arm, the rear support wall, and the base container.

18. The system of claim 1, wherein the rotatable locking arm has a first end member disposed orthogonal to a central member, a second end member opposite to the first end member disposed orthogonal to a central member, and first mid-member disposed orthogonal to the midsection of the central member.

19. An equipment rack system, comprising:
a base container forming a partial enclosure, the base container including a bottom wall and a set of sidewalls, the bottom wall and the set of sidewalls are attached, the set of sidewalls comprising a first sidewall, a second sidewall, a third sidewall, and a fourth sidewall, a first end of the first sidewall connected to a first end of the third sidewall, a second end of the third sidewall connected to a first end of the second sidewall, a second end of the second sidewall connected to a first end of the fourth sidewall, wherein a first face of the fourth sidewall is configured to face a first face of the third sidewall and a first face of the second sidewall is configured to face a first face of the first sidewall, wherein the bottom wall and the set of sidewalls of the base container are attached, the third sidewall having a substantial V-shaped cut out, the partial enclosure formed by the base container being configured to at least partially enclose a piece of equipment, the set of sidewalls traversing the bottom wall along a perimeter of the bottom wall, wherein the bottom wall and the set of sidewalls are joined together to form the partial enclosure such that the equipment relative the base container when partially enclosed by the base container is prevented from freely rotating about all axes of rotation relative to the base container;

a rear support wall coupled to a second face of the second sidewall of the base container and an equipment clip, the rear support wall traversing the base container in a first direction, the rear support wall including a locking mechanism;

the coupling between the rear support wall and the second face of the second sidewall of the base container is adjustable to enclose different equipment dimensions within the base container and rear support wall; and a rotatable locking arm held by the rear support wall, the rotatable locking arm having a first end member directly coupled to a hinge, and a second end member configured to enter a locked position when the rotatable locking arm is rotated about the hinge from a first position to a second position, the locked position maintained by a padlock, wherein the rear support wall forms a partial enclosure, the rear support wall including a second set of sidewalls, the hinge, and the rotatable locking arm joined together such that the equipment relative to the rear support wall when partially enclosed by the rear support wall is prevented from freely rotating about all axis of rotation relative to the base container.

20. The equipment rack system of claim 19, further comprising:

the rear support wall including a locking mechanism and the second end member comprising a complementary locking mechanism; and the locking mechanism of the rear support wall and the complementary locking mechanism of the rotatable locking arm being configured to cooperatively engage to define a locked position of the rotatable locking arm, the rotatable locking arm in the locked position being configured to enclose a portion of the equipment in a space between the rotatable locking arm and the rear support wall such that removal of the equipment from the base container is restricted.

* * * * *